United States Patent [19]
Matsushita

[11] Patent Number: 5,285,264
[45] Date of Patent: Feb. 8, 1994

[54] IMAGE REPRODUCTION APPARATUS WITH PLURAL PROGRAM PROCESSING

[75] Inventor: Akira Matsushita, Fukaya, Japan

[73] Assignee: Kabushiki Kaisha Toshiba, Kawasaki, Japan

[21] Appl. No.: 895,237

[22] Filed: Jun. 8, 1992

Related U.S. Application Data

[63] Continuation-in-part of Ser. No. 670,015, Mar. 15, 1991, abandoned.

[30] Foreign Application Priority Data

Mar. 30, 1990 [JP] Japan ................................. 2-84628

[51] Int. Cl.$^5$ .................. H04N 9/64; H04N 5/14; H04N 5/213
[52] U.S. Cl. .................................. 348/571; 345/614; 345/705
[58] Field of Search ............... 358/21 R, 36, 167, 160, 358/903, 185, 21 V, 905; 395/118, 155; 382/41, 42; H04N 9/64, 5/14, 5/213

[56] References Cited

U.S. PATENT DOCUMENTS

| | | | |
|---|---|---|---|
| 4,800,439 | 1/1989 | Murakami et al. | 358/160 |
| 4,825,287 | 4/1989 | Baji et al. | 358/160 |
| 4,845,767 | 7/1989 | Mori et al. | 358/160 X |
| 4,942,470 | 7/1990 | Nishitani et al. | 358/160 |
| 4,991,019 | 2/1991 | Enami et al. | 358/160 |
| 5,032,916 | 7/1991 | Matsuura et al. | 358/167 |

FOREIGN PATENT DOCUMENTS

| | | |
|---|---|---|
| 0155675 | 9/1985 | European Pat. Off. |
| 0249962 | 12/1987 | European Pat. Off. |
| 1-236383 | 9/1989 | Japan |

OTHER PUBLICATIONS

SMPTE Journal, vol 96, No. 6, pp. 527–531, Jun. 1987, K. Murakami, et al., "A Proposed Universal Signal-Processing System".

IEEE Transactions On Broadcasting, vol. 35, No. 4, pp. 359–347, Dec. 1989, H. Miyazawa, et al., "Development Of A Ghost Cancel Reference Signal For TV Broadcasting".

IEEE Transactions On Consumer Electronics, vol. 36, No. 4, pp. 819–824, Nov., 1990, H. Iga, et al., "Ghost Clean System".

van Roermund et al, "A General-Purpose Programmable Video Signal Processor", IEEE Transactions on Consumer Electronics, vol. 35, No. 3, Aug. 1989, 249–258.

Schmidt et al, "Data-Driven Array Processor for Video Signal Processing", 1990 IEEE, pp. 326–327.

*Primary Examiner*—Mark R. Powell
*Assistant Examiner*—Safet Metjahic
*Attorney, Agent, or Firm*—Oblon, Spivak, McClelland, Maier & Neustadt

[57] ABSTRACT

This invention relates to an image reproduction apparatus for performing video signal processing by utilizing a plurality of DSPs. A digital video signal is supplied to a DSP signal processor constituted by combining the plurality of DSPs, and programs to be supplied to the plurality of DSPs are time-divisionally switched on the basis of a transmission timing of the video signal, so that the DSP signal processor can execute a plurality of systems of processing operations, and many functions can be added without increasing a circuit scale.

4 Claims, 28 Drawing Sheets

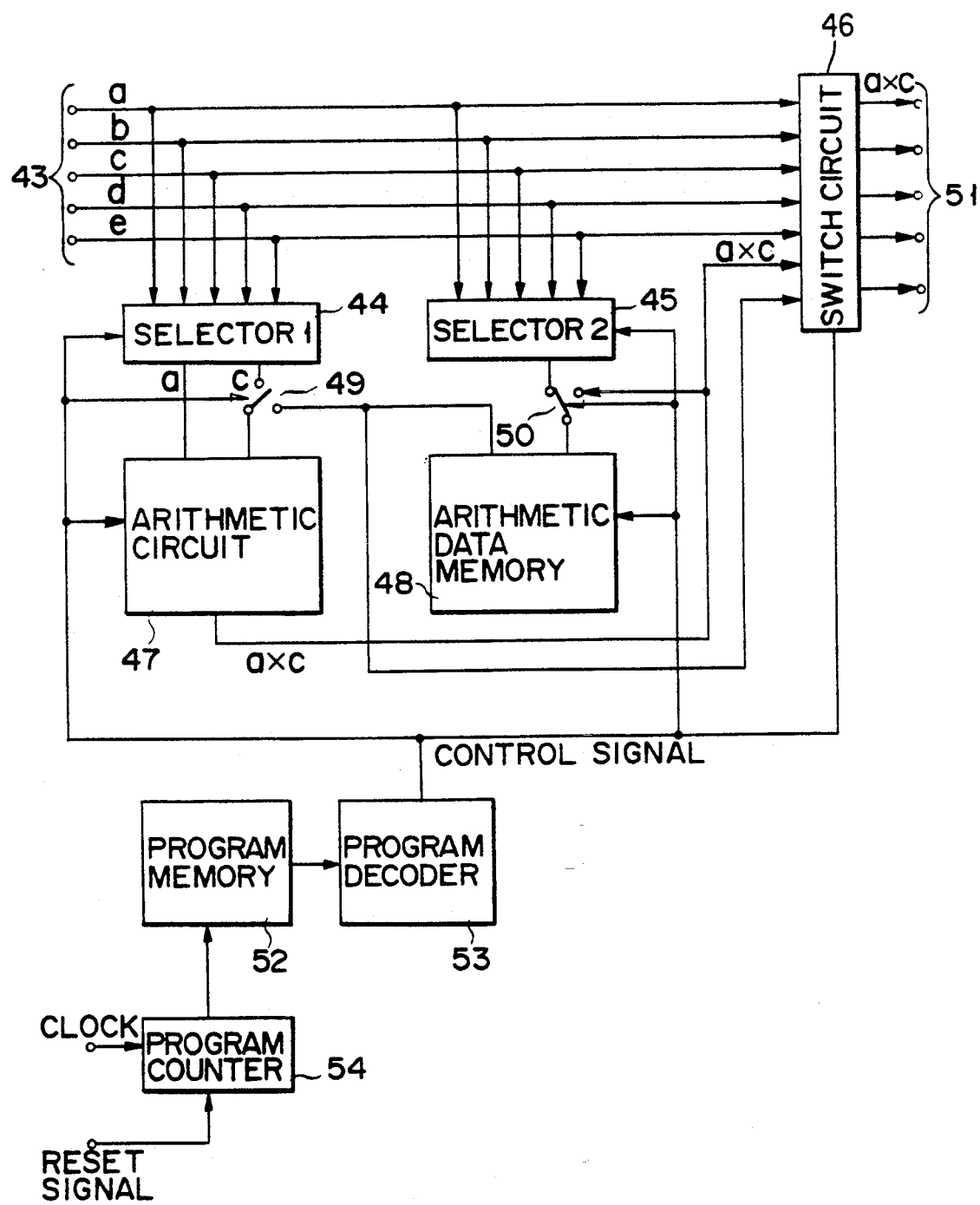
F I G. 9

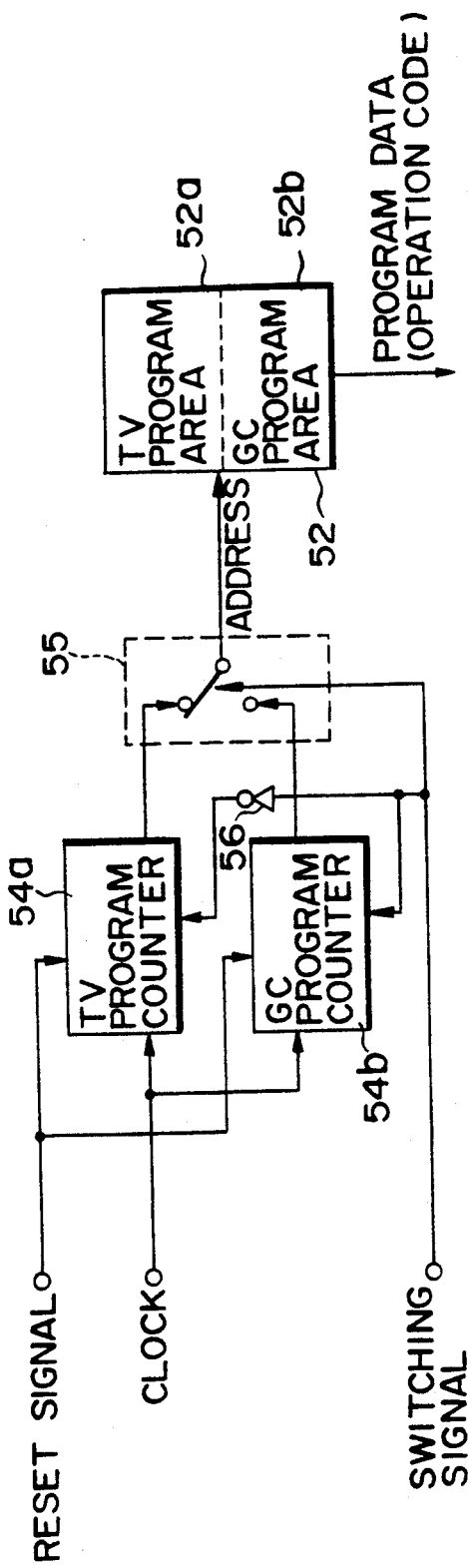
F I G. 10
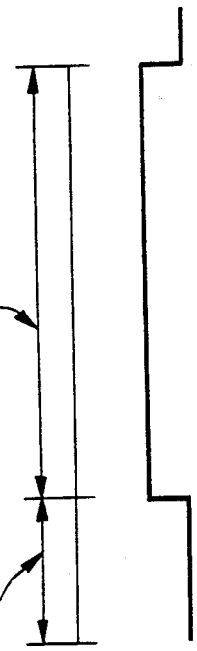
F I G. 11

| DSP No | VIDEO SIGNAL PROCESSING | GHOST CANCEL PROCESSING |
|---|---|---|
| DSP 11 | VIDEO INTERFACE PROCESSING | VIDEO INTERFACE PROCESSING |
| DSP 1n | MATRIX PROCESSING | VIDEO INTERFACE PROCESSING |
| DSP 21 | CHROMINANCE SEPARATION PROCESSING | TAP COEFFICIENT SETTING PROCESSING |
| DSP 22 | CHROMINANCE DEMODULATION PROCESSING | WAVEFORM FETCHING GCR DETECTION PROCESSING |
| DSP 23 | LUMINANCE SEPARATION PROCESSING | |
| DSP 24 | EDGE CORRECTION PROCESSING | |
| DSP 25 | CONTRAST CONTROL PROCESSING | DIFFERENCE ARITHMETIC PROCESSING |
| DSP 26 | (INACTIVE) | PEAK DETECTION PROCESSING |
| | | |
| DSP 31 | fsc REPRODUCTION PROCESSING | (INACTIVE) |
| DSP 32 | | WAVEFORM FETCHING GCR DETECTION PROCESSING |
| DSP 33 | | |
| DSP 34 | | |
| DSP 35 | | DIFFERENCE ARITHMETIC PROCESSING |
| DSP 36 | | ERROR DETECTION, CORRELATION ARITHMETIC PROCESSING |
| DSP 37 | | MULTIPLICATION, SUBTRACTION PROCESSING |
| DSP 38 | | (INACTIVE) |
| | | |
| DSP m1 | SET PARAMETERS FOR EDGE CORRECTION, CONTRAST CONTROL, AND CHROMINANCE DEMODULATION | INTERFACE PROCESSING OF WAVEFORM MEMORY DATA, AND ERROR DATA |

FIG. 14

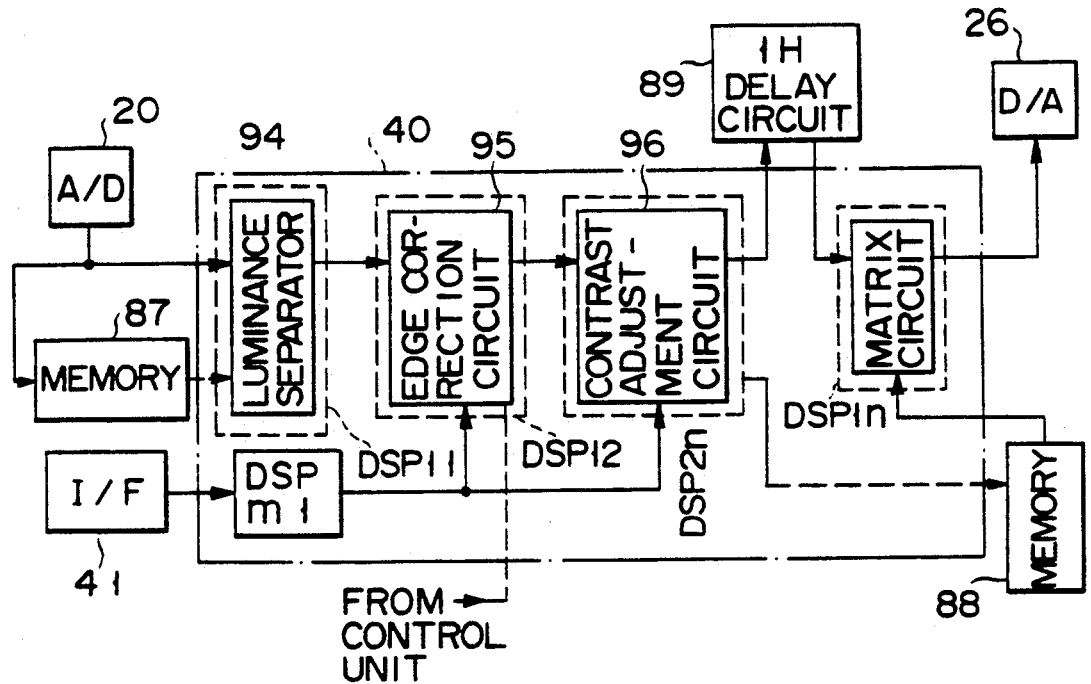
F I G. 19A
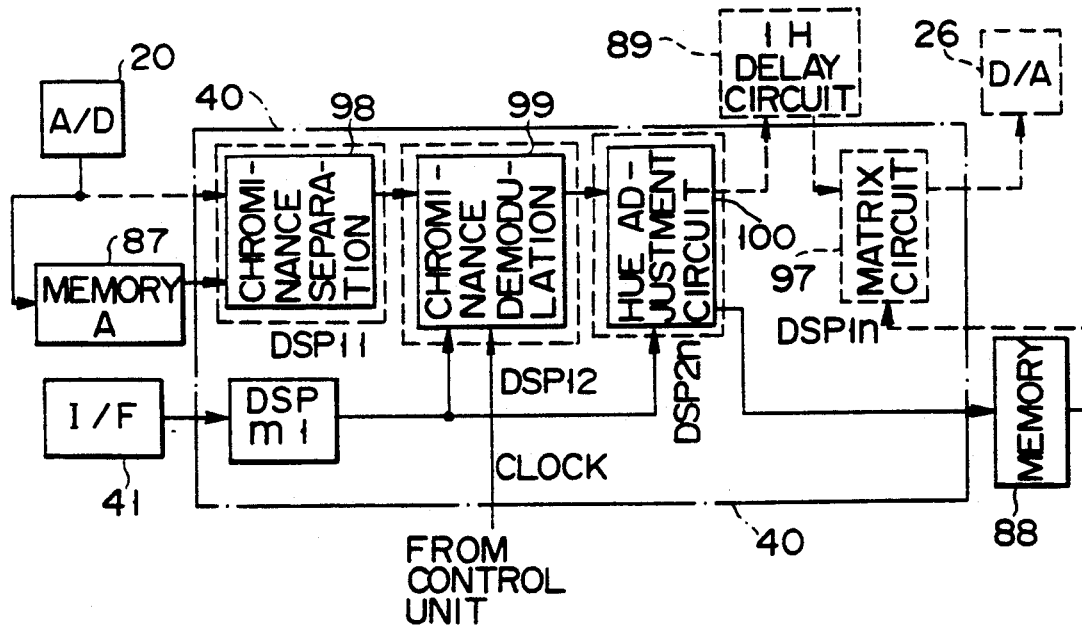
F I G. 19B

| DSP NO | LUMINANCE PROCESSING | CHROMINANCE SIGNAL PROCESSING |
|---|---|---|
| DSP 11 | LUMINANCE SEPARATION PROCESSING | CHROMINANCE SEPARATION PROCESSING |
| DSP 12 | EDGE CORRECTION PROCESSING | CHROMINANCE DEMODULATION PROCESSING |
| DSP 2n | CONTRAST ADJUSTMENT PROCESSING | HUE ADJUSTMENT PROCESSING |
| DSP 1n | MATRIX PROCESSING | (INACTIVE) |
| DSP m1 | SET EDGE CORRECTION AMOUNT, AND CONTRAST ADJUSTMENT AMOUNT | SET MODULATION AXIS OF CHROMINANCE DEMODULATION, AND HUE ADJUSTMENT AMOUNT |

| NAME | BINARY CODE | 16-SCALE | CONTENTS |
|---|---|---|---|
| ⋮ | | | |
| INPUT 1 | 10000000-10000100 | 80 – 84 | OUTPUT A, B, C, D, OR E TO TERMINAL 1; 80 : A-84 : E |
| INPUT 2 | 10001000-10001100 | 88 – 8C | OUTPUT A, B, C, D, OR E TO TERMINAL 2; 88 : A-8C : E |
| INPUT 3 | 10010000-10010100 | 90 – 94 | OUTPUT A, B, C, D, OR E TO TERMINAL 3; 90 : A-94 : E |
| OUTPUT 1 | 10011000-10011110 | 98 – 9E | OUTPUT ONE OF 9-15 TO TERMINAL 4; 98 : 9-9E : 15 |
| OUTPUT 2 | 10100000-10100100 | A0 – A6 | OUTPUT ONE OF 9-15 TO TERMINAL 5; A8 : 9-A6 : 15 |
| OUTPUT 3 | 10101000-10101110 | A8 – AE | OUTPUT ONE OF 9-15 TO TERMINAL 6; A8-AE : 15 |
| OUTPUT 4 | 10110000-10110110 | B0 – B6 | OUTPUT ONE OF 9-15 TO TERMINAL 7; B0 : 9-B6 : 15 |
| OUTPUT 5 | 10111000-10111110 | B8 – BE | OUTPUT ONE OF 9-15 TO TERMINAL 8; B8 : 9-BE : 15 |
| MULT. 1 | 11000XXX | C0 | MULTIPLY DATA ITEMS AT TERMINALS 1 AND 3 |
| MULT. 2 | 11001000-11001111 | C8 – CF | MULTIPLY ITEM AT TERMINAL 1 AND DATA IN MEMORY 48; C8: MULTIPLY DATA AT ADDR. 0; CF: MULTIPLY DATA AT ADDR. 27 |
| ADD. 1 | 11010XXX | D0 | ADD DATA ITEMS AT TERMINALS 1 AND 2 |
| ADD. 2 | 11011000-11011111 | D8 – DF | ADD DATA AT TERMINAL 1 AND DATA IN MEMORY 48; D8: ADD DATA AT ADDR. 0 DF: ADD DATA AT ADDR. 7 |
| ⋮ | | | |

| MEMORY ADDRESS | INSTRUCTION DATA |
|---|---|
| ⋮ | |
| n | 80 |
| n+1 | 8A |
| n+2 | C0 |
| n+3 | 9D |
| ⋮ | |

*FIG. 24*

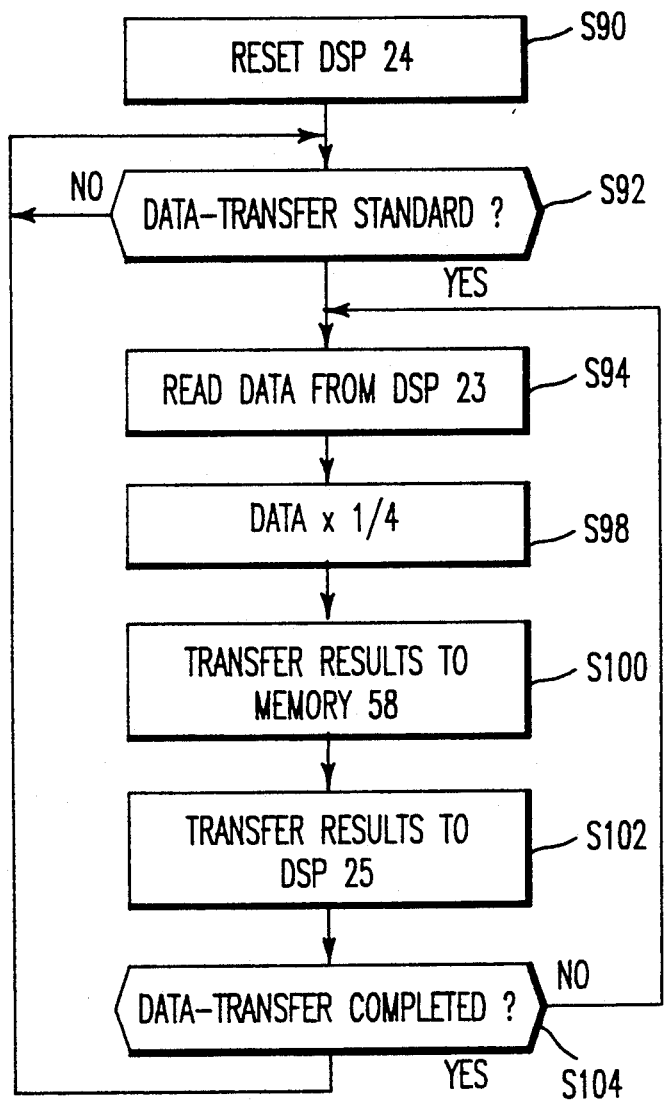

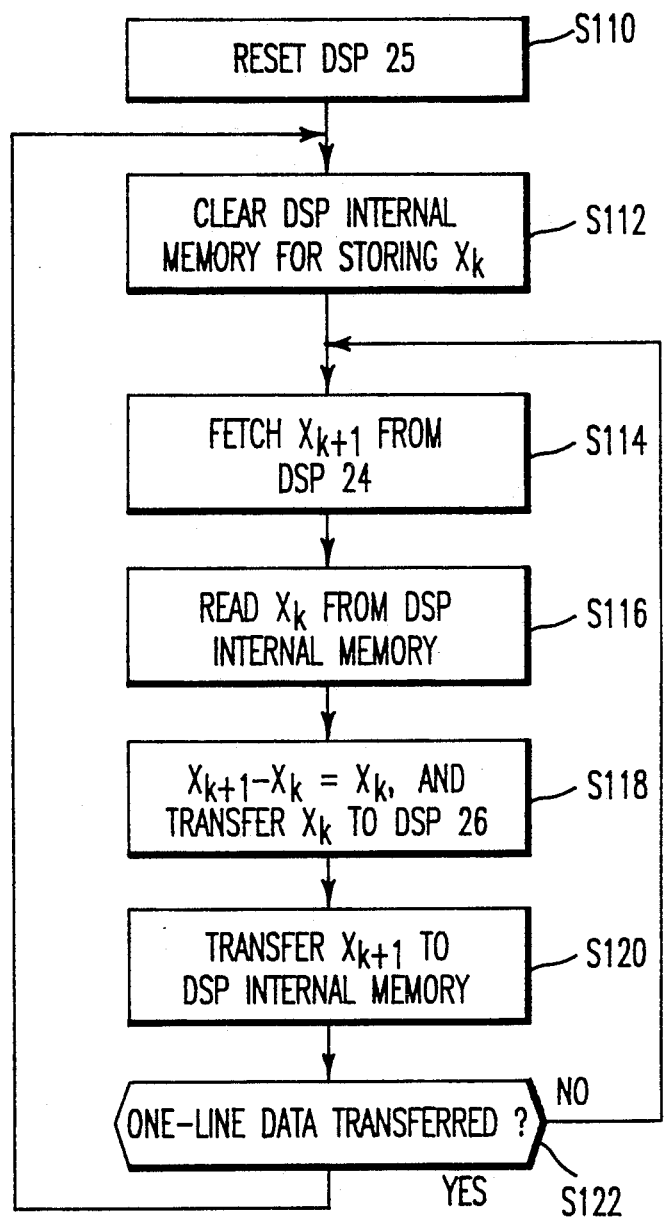

IMAGE REPRODUCTION APPARATUS WITH PLURAL PROGRAM PROCESSING

This application is a continuation-in-part of application Ser. No. 07/670,015, filed on Mar. 15, 1991, now abandoned.

BACKGROUND OF THE INVENTION

1. Field of the Invention

The present invention relates to an image reproduction apparatus utilizing a plurality of DSPs (digital signal processors) and, more particularly, to an image reproduction apparatus which can efficiently perform various signal processing operations using a smaller number of DSPs.

2. Description of the Related Art

As is well known, a conventional image reproduction apparatus, e.g., a television receiver, a video tape recorder, and the like performs various signal processing operations by arranging special-purpose circuits for the corresponding processing operations. For example, in a conventional television receiver added with a ghost cancel function, a section for performing reproduction processing of video and voice signals, and a section for performing ghost cancel processing are independently arranged as special-purpose hardware units. For this reason, when a teletext receiving function, for example, is to be added in addition to the ghost cancel function, a hardware unit exclusively used for the teletext receiving processing is required. More specifically, in the conventional image reproduction apparatus, blocks for executing signal processing operations are required in units of functions, and as the number of functions is increased, a circuit scale is undesirably increased.

SUMMARY OF THE INVENTION

The present invention has been made in consideration of the above situation, and has as its object to provide an image reproduction apparatus, in which a signal processing circuit is constituted by utilizing DSPs, and programs supplied to the DSPs are changed to execute a plurality of signal processing operations, so that many functions can be added without increasing a circuit scale.

According to one aspect of the present invention, there is provided an image reproduction apparatus for converting an input video signal into a digital signal and performing a plurality of systems of signal processing operations of the digital video signal, comprising a DSP signal processor constituted by combining a plurality of DSPs each incorporating a program memory which stores a plurality of programs corresponding to the plurality of systems of signal processing operations in independent areas, and a switching circuit for addressing the areas of the program memory incorporated in each of the plurality of DSPs of the DSP signal processor to time-divisionally switch the program to be supplied to the plurality of DSPs on the basis of a transmission timing of the video signal.

The image reproduction apparatus according to the present invention comprises a DSP signal processor incorporating a program memory, arranged outside the plurality of DSPs of the DSP signal processor, for storing a plurality of programs corresponding to a plurality of systems of signal processing operations, and a switching circuit for time-divisionally switching desired programs from the memories on the basis of a transmission timing of the video signal, and causing the program memory of each of the DSPs to load the switched program.

BRIEF DESCRIPTION OF THE DRAWINGS

FIG. 9 is a block diagram showing an equivalent internal structure of the DSP;

FIG. 10 is a block diagram showing a switching means for a program to be supplied to the DSP;

FIG. 11 is a timing chart for explaining an operation of the switching means;

FIG. 14 is a comparison table of processing operations to be executed by the DSPs when the ghost cancel processing and video signal processing are executed;

FIGS. 19A and 19B are respectively schematic block diagrams of luminance signal processing and chrominance signal processing by DSPs of the embodiment shown in FIG. 17;

FIG. 20 is a comparison table of processing operations to be executed by DSPs when the luminance signal processing and chrominance signal processing are executed;

FIG. 23 shows a table with sample instructions utilized in the present invention;

FIG. 24 is a table with sample instructions to perform a multiplication processing;

FIG. 31 is a flow chart showing operation of DSP 24 of the present invention; and FIG. 32 is a flow chart showing operation of DSP 25 of the present invention.

DETAILED DESCRIPTION OF THE PREFERRED EMBODIMENTS

Figure 1:
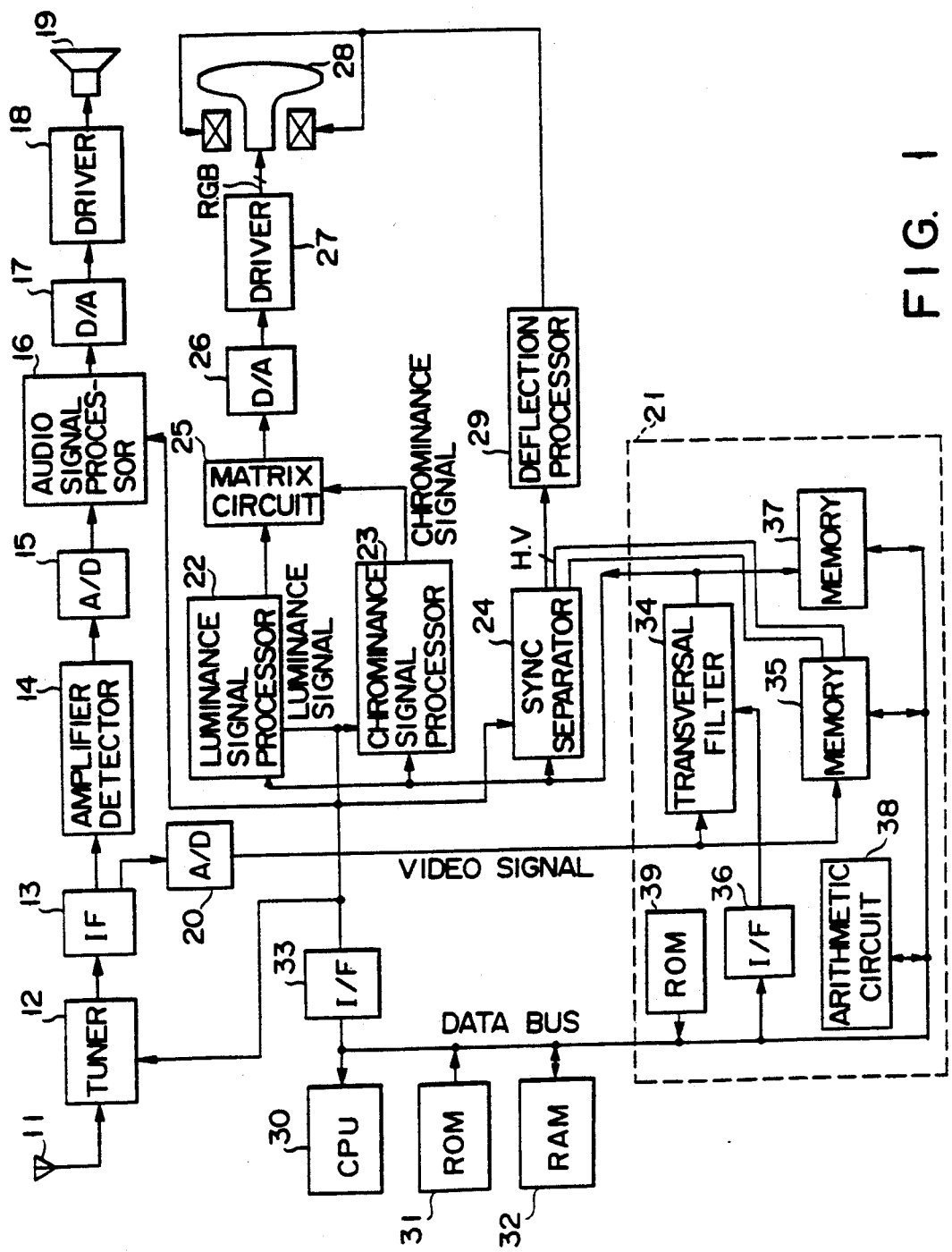
FIG. 1 is a block diagram showing an arrangement of a television receiver added with a ghost cancel function.

Prior to a description of an embodiment of the present invention, signal processing functions described in this embodiment will be briefly explained below. FIG. 1 shows an arrangement of a television receiver added with a ghost cancel function. A television radio wave received by an antenna 11 is supplied to a tuner 12. A desired channel signal is selected by the tuner 12, and is converted into an intermediate frequency (IF) signal. The IF signal is output to an IF processor 13. The IF processor 13 amplifies and detects the input IF signal, and separates it into a video bass-band signal, and an audio IF signal. The audio IF signal is supplied to an audio IF amplifier/detector 14, and is amplified and detected by the amplifier/detector 14. Thereafter, the audio IF signal is converted into a digital signal by an A/D (analog-to-digital) converter 15. The output from the A/D converter 15 is supplied to an audio signal processor 16, and is subjected to various processing operations such as audio multiplex processing, sound quality processing, balance processing, and the like. Thereafter, the digital signal is converted into an analog signal by a D/A (digital-to-analog) converter 17. The analog signal is input to a loudspeaker 19 via a driver 18.

On the other hand, the video signal separated by the IF processor 13 is converted into a digital signal by an A/D converter 20, and the digital signal is supplied to a ghost cancel block 21 (to be described later), which removes a ghost component. The video signal from which the ghost component is removed by the ghost cancel block 21 is supplied to a luminance signal processor 22, a chrominance signal processor 23, and a sync separator 24. The luminance signal processor 22 executes processing of the input video signal, e.g., adjustment of a contrast, image quality, and the like, and outputs the processed signal to one input of a matrix circuit 25. The chrominance signal processor 23 performs color contrast adjustment, hue adjustment, and chrominance demodulation, and the like of the input video signal, and outputs the processed signal as the other input of the matrix circuit 25. The matrix circuit 25 generates R, G, and B component digital signals on the basis of the outputs from the luminance signal processor 22 and the chrominance signal processor 23. These digital signals are converted into analog signals by a D/A converter 26, and the analog signals are then subjected to image display on a CRT (cathode ray tube) 28 via a driver 27. The sync separator 24 executes processing for reproducing, e.g., a horizontal sync signal H and a vertical sync signal V. A horizontal deflection signal, a vertical deflection signal, right and left raster distortion correction signals, and the like are generated by a deflection processor 29 on the basis of the reproduced horizontal and vertical sync signals H and V, and are subjected to control of the CRT 28.

In FIG. 1, reference numeral 30 denotes a microprocessor (to be referred to as a CPU hereinafter). The CPU 30 controls respective circuits via an interface 33, using a program ROM (read-only memory) 31, and an arithmetic RAM (random-access memory) 32, on the basis of various parameters indicating a channel, a tone volume, brightness, color tone, and the like designated by a user using an operation unit of a television receiver main body or a remote control transmitter.

Figure 2:
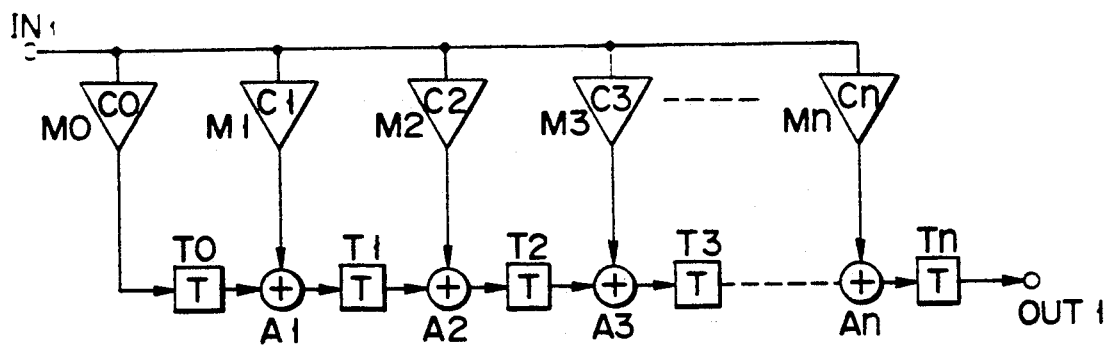
FIG. 2 is a block diagram showing a detailed arrangement of a transversal filter used in the television receiver.

The ghost cancel block 21 will now be described below. The digital video signal converted by the A/D converter 20 is supplied to a transversal filter 34, and an input waveform memory 35. The transversal filter 34 has an arrangement, as shown in FIG. 2, which exemplifies an n-tap arrangement (n is an integer). A video signal supplied to an input terminal IN1 is multiplied with tap coefficients C0, C1, C2, C3, . . . , Cn by multipliers M0, M1, M2, M3, . . . , Mn, and outputs from the multipliers M0 to Mn are convoluted by delay circuits T0, T1, T2, T3, . . . , Tn, and adders A1, A2, A3, . . . , An, so that a video signal from which a distortion component caused by ghost is removed is output from an output terminal OUT1. The tap coefficients C0 to Cn of the multipliers M0 to Mn are set by the CPU 30 via an interface 36.

The input waveform memory 35 fetches and stores a ghost reference signal waveform (GCR) superposed on a vertical blanking period of a video signal containing a ghost component. The video signal subjected to arithmetic processing by the transversal filter 34 is supplied to an output waveform memory 37. The output waveform memory 37 fetches and stores a ghost reference signal waveform (GCR) superposed on the vertical blanking period of the video signal. The signals fetched by the input and output waveform memories 35 and 37 are subjected to predetermined arithmetic processing by an arithmetic circuit 38. Thereafter, an error component between the calculated signal and a reference waveform stored in a reference waveform ROM 39 is calculated. The arithmetic circuit 38 calculates the tap coefficients C0 to Cn on the basis of the error component, and supplies them to the transversal filter 34 via the interface 36, thus executing a series of ghost cancel operations.

Figure 6:
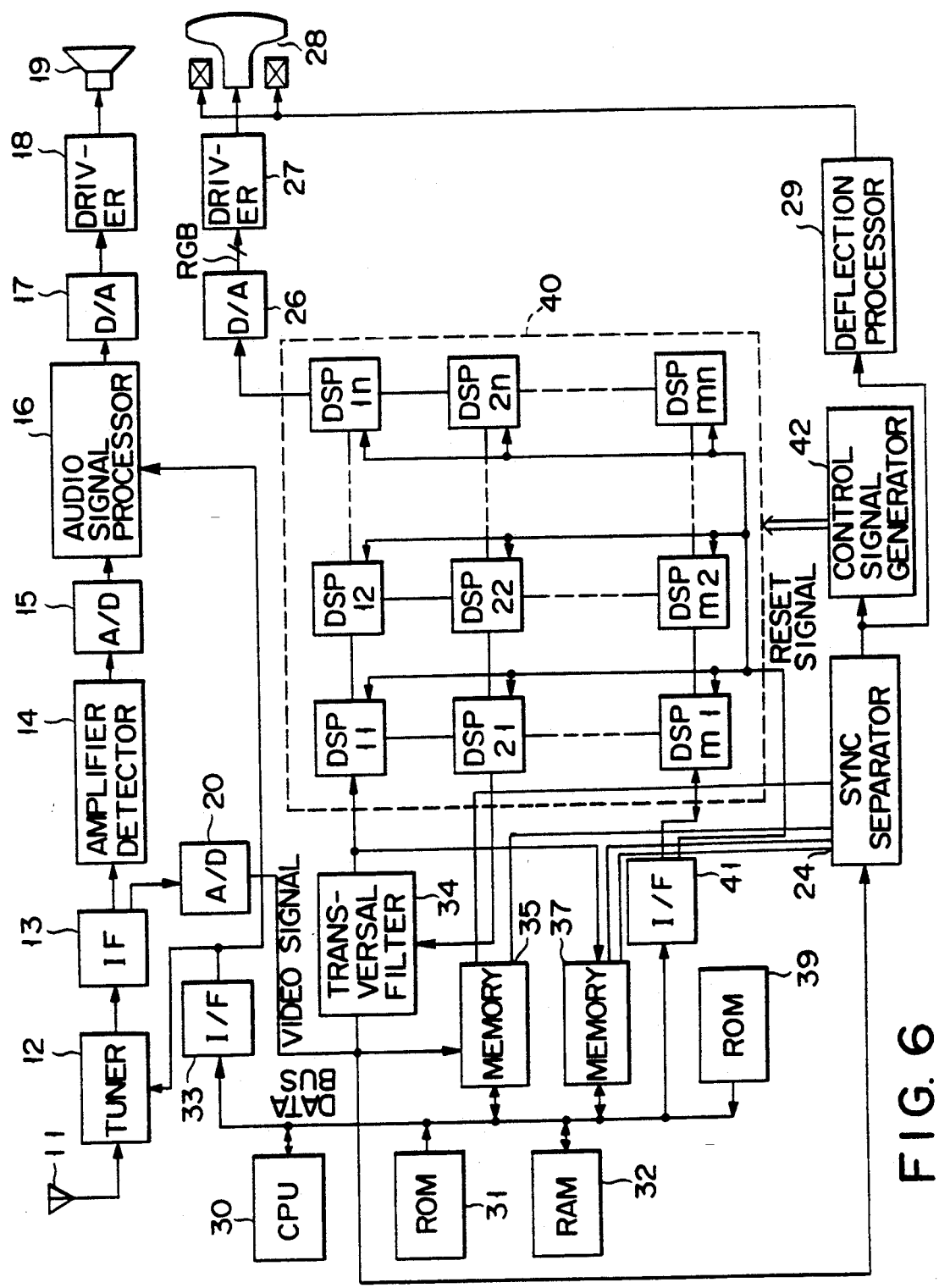
FIG. 6 is a block diagram showing an embodiment of an image reproduction apparatus according to the present invention.
Figure 12:
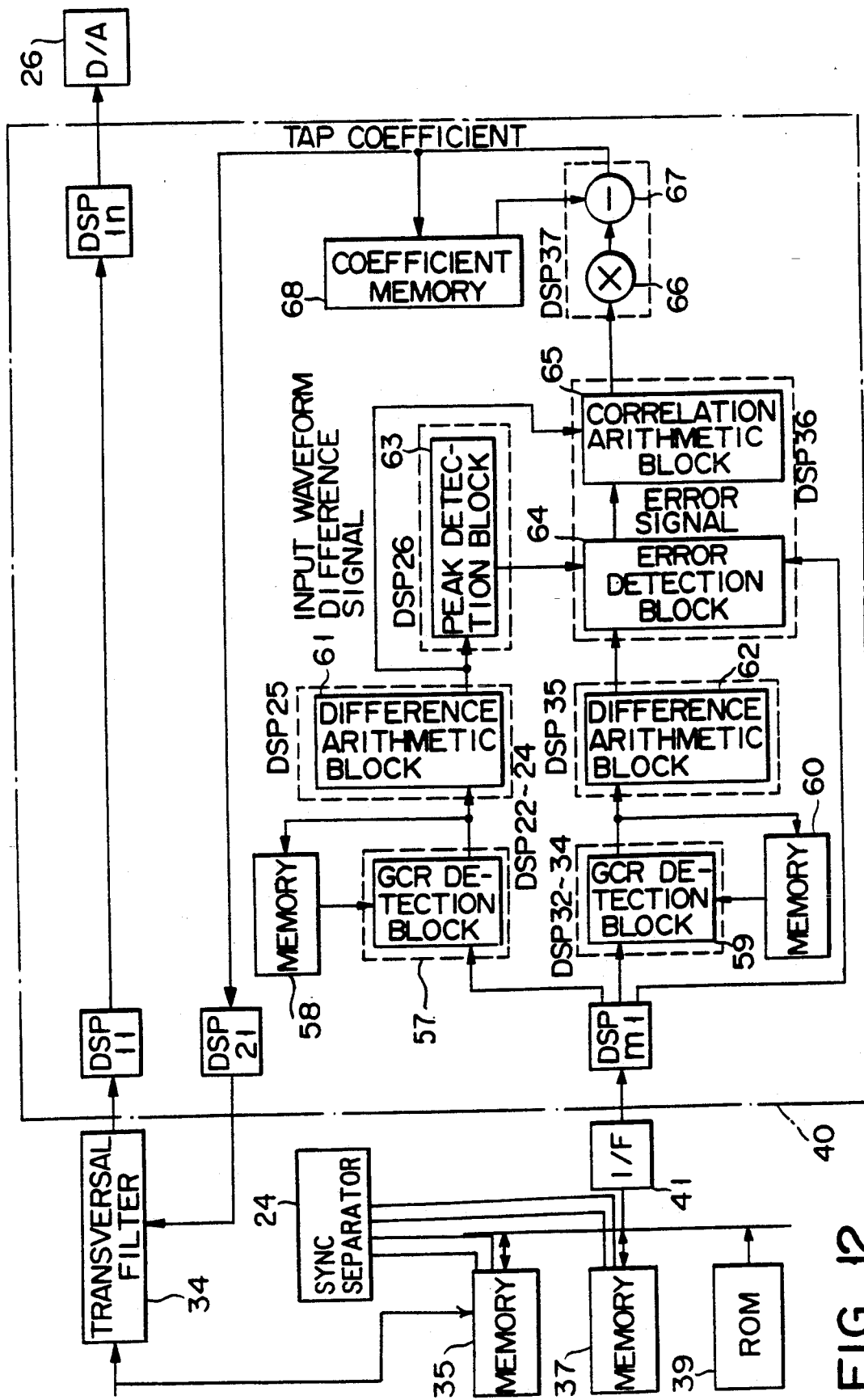
FIG. 12 is a schematic block diagram showing ghost cancel processing by the DSP.

A GCR is loaded into memory 35 when sync separator 24 supplies an address signal and a write signal to memory 35 via the respective lines connecting sync separator 24 with memory 35, which are also shown in FIGS. 6 and 12. Sync separator 24 generates the address signal and the write signal only for periods 18H and 281H, during which a GCR is superposed.

Figure 21:
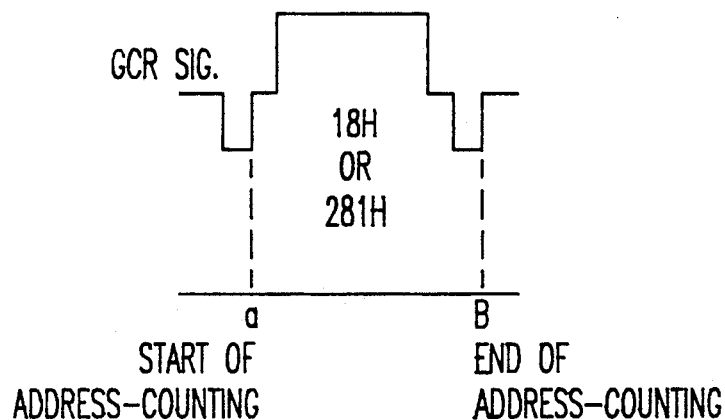
FIG. 21 shows a waveform describing loading a GCR into memory.

As is shown in FIG. 21, the address signal rises to a high level at address count of 0 (i.e., the rise timing a of the horizontal synchronization) and falls to a low level at an address count of 910, for example, (i.e., the fall timing b of the horizontal synchronization). The write signal is generated by sync operator 24, for the period the count increases from 0 to 910. Hence, it is during this period that the GCR is loaded into memory 35.

Figure 22:
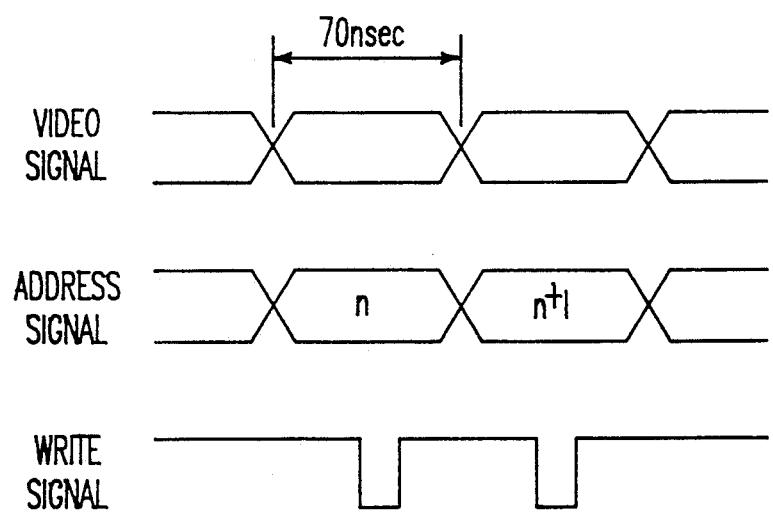
FIG. 22 shows a timing of loading a GCR into memory.

FIG. 22 shows the timing of loading the GCR into memory 35. The address signal is incremented by one every 70 nsec, for example, since the video signal that may be used here is a digital signal obtained by sampling an analog signal at intervals of 70 nsec. The GCR is loaded into memory 35 while the write signal remains at the low level.

Figure 3:
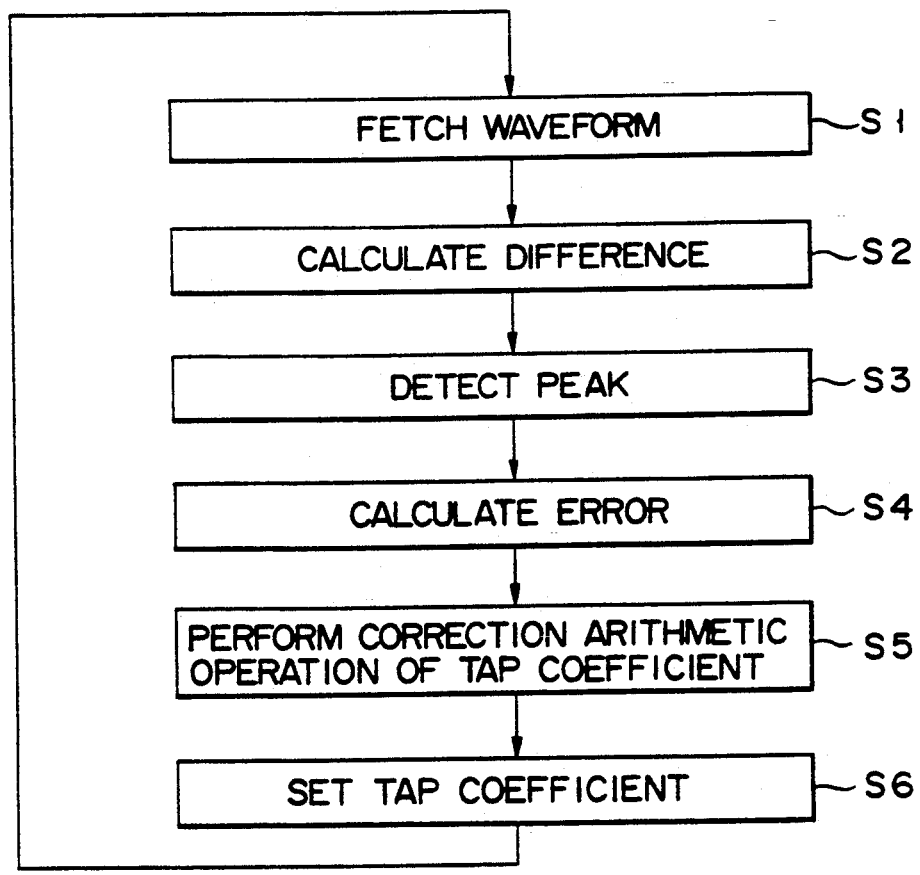
FIG. 3 is a flow chart for explaining an operation of ghost cancel processing of the television receiver.

The ghost cancel operations will now be described in detail below with reference to the flow chart of FIG. 3. In step S1, waveforms input to and output from the transversal filter 34 are fetched in the input and output waveform memories 35 and 37, respectively. The waveforms fetched in the input and output waveform memories 35 and 37 are supplied to the arithmetic circuit 38, thus extracting GCR signals SGCR. Extraction of the GCR signals SGCR is realized by executing the following arithmetic operation in an 8-field sequence shown in FIG. 4:

$$SGCR = (\tfrac{1}{4}) \cdot \{(S1-S5)+(S6-S2)+(S3-S7)+(S8-S4)\}$$

Figure 5:
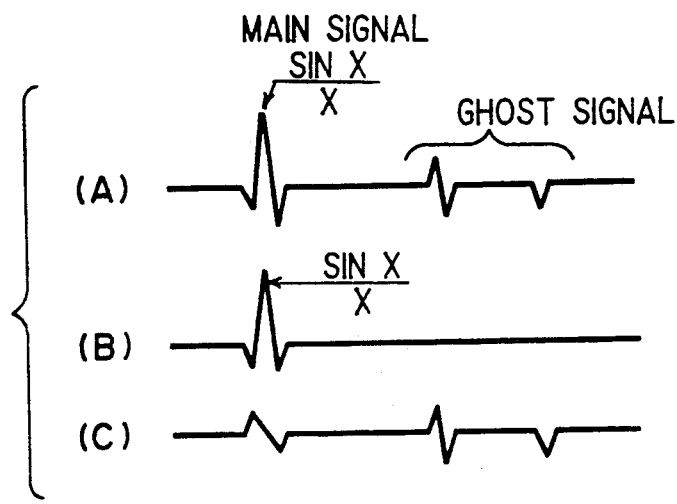
FIGS. 5A to 5C are waveform charts for explaining an operation of the ghost cancel processing.

Thereafter, in step S2, the arithmetic circuit 38 executes a difference calculation on the basis of the extracted GCR signals SGCR, thus obtaining an input waveform difference signal, as shown in FIG. 5A. In step S3, a peak position of the input waveform difference signal is detected. The peak position of the input waveform difference signal serves as a reference used when the above-mentioned tap coefficients C0 to Cn are corrected. A peak position of an output waveform is calculated based on this peak position using the arithmetic circuit 38, and is subtracted from the reference waveform (FIG. 5B) stored in the reference waveform ROM 39 in step S4, thereby obtaining an error signal shown in FIG. 5C.

In step S5, the tap coefficients C0 to Cn to be supplied to the transversal filter 34 are corrected by utilizing the error signal obtained in this manner.

Arithmetic operations of these tap coefficients C0 to Cn are executed by the following correlation arithmetic operation:

$$Cinew = Ciold - \alpha \cdot \Sigma Xk \cdot ek + i$$

where Ci is the ith tap coefficient, and suffixes "new" and "old" represent before and after correction, Xk is the input signal, ek is the error signal, and $\alpha$ is a very small positive amount. The new tap coefficients Cinew are set in the transversal filter 34 via the interface 36, and thereafter, the above-mentioned operations are repeated to remove a ghost component.

An embodiment wherein the present invention is applied to the television receiver added with the ghost cancel function will be described below with reference to the accompanying drawings. The same reference numerals in FIG. 6 denote the same parts as in FIG. 1. Reference numeral 40 in FIG. 6 denotes a DSP signal processor, which comprises a plurality of DSPs 11 to mn. The DSP signal processor 40 is controlled by an output from the CPU 30 supplied to the DSPs 11 to mn via an interface 41. The interface 41 supplies two systems of signals to the DSP signal processor 40. One signal includes input/output waveform data and control data necessary in ghost cancel processing, or parallel control data necessary in television signal processing, and the other signal includes a reset signal for defining start timings of programs in the DSPs 11 to mn. The DSP signal processor 40 is controlled by an output from a control signal generator 42 for generating a control signal on the basis of an output from the sync separator 24. The output from the transversal filter 34 is supplied to the DSP 11 in the DSP signal processor 40, and tap coefficients are set in the transversal filter 34 by the DSP 21.

Figure 7:
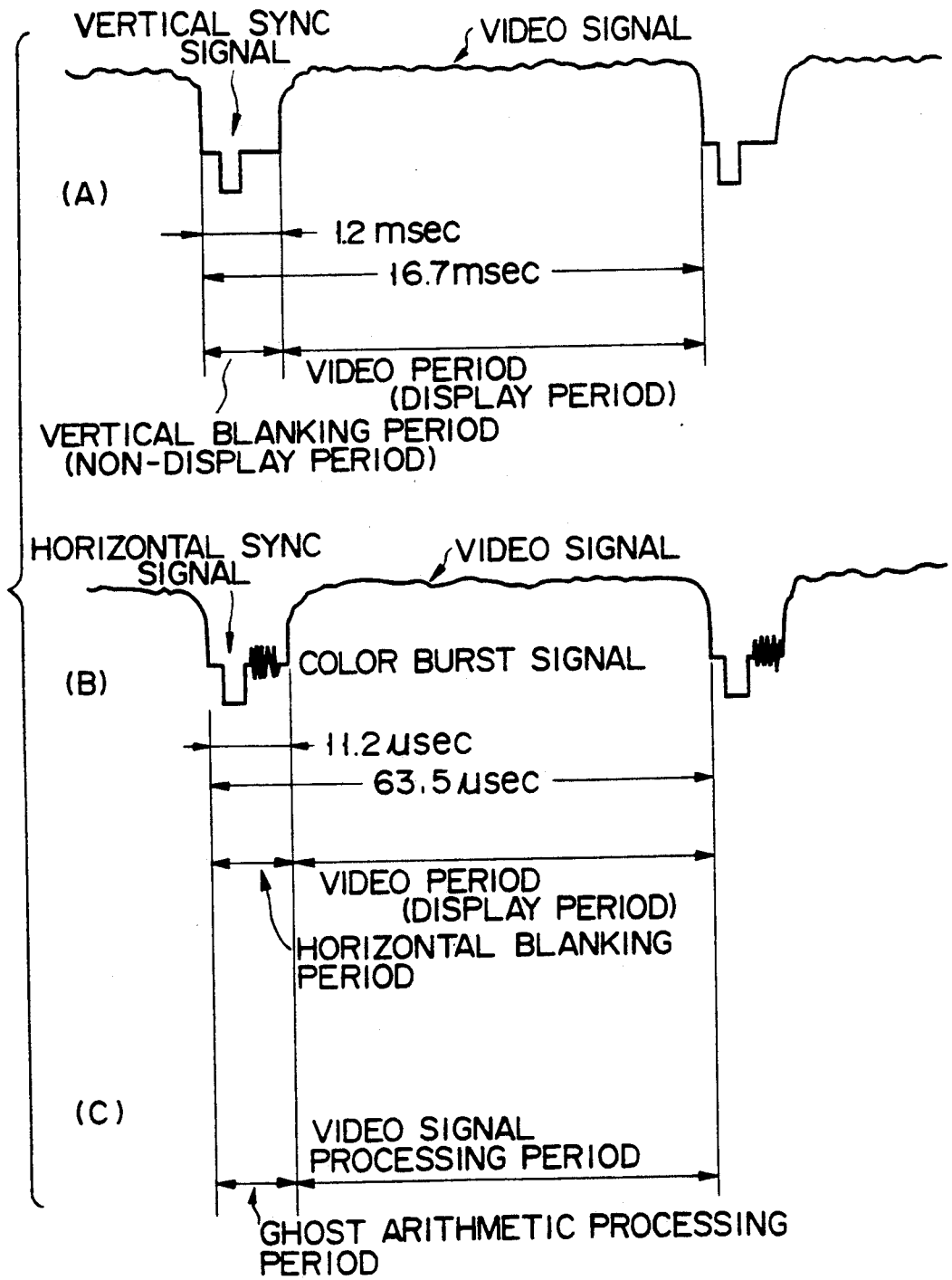
FIGS. 7A to 7C are views for explaining a ghost arithmetic processing period, and a video signal processing period of a DSP used in this embodiment.

The operation of the above-mentioned arrangement will now be described below. FIG. 7A is a chart obtained when a video signal is viewed in a vertical period, and FIG. 7B is a chart obtained when a video signal is viewed in a horizontal period. In either chart, the video signal is constituted by a video period, and a vertical or horizontal blanking period. As can be seen from FIGS. 7A and 7B, luminance signal processing, chrominance signal processing, and the like can be executed by the DSP signal processor 40 during only the video period, and need not be executed during other periods, i.e., blanking periods. Thus, according to the present invention, processing other than luminance signal processing, chrominance signal processing, and the like is executed by the DSP signal processor 40 during the blanking periods, thus efficiently using the plurality of DSPs 11 to mn. In this embodiment, the DSP signal processor 40 performs ghost cancel arithmetic processing during the blanking periods, as shown in FIG. 7C.

Figure 8A:
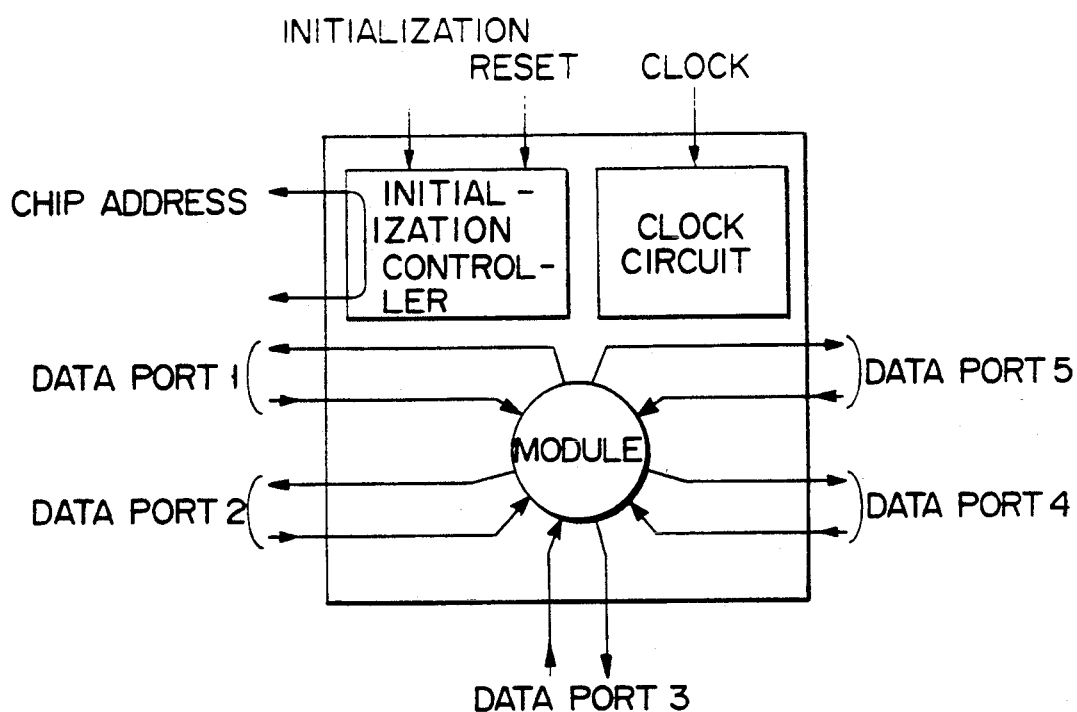
FIG. 8A to 8E are schematic diagrams for explaining the DSP.

The structure of typical DSPs 11 to mn will be described below. FIG. 8A shows a basic structure of typical DSP developed as a digital signal processor for video signal processing. This DSP has five data ports in consideration of connection with a plurality of DSPs. Such a multi-data-port structure is the general feature of the DSP developed for video signal processing. The DSP signal processor 40 is designed such that DSPs are connected to one DSP in four directions, i.e., upper, lower, right, and left directions.

Figure 8B:
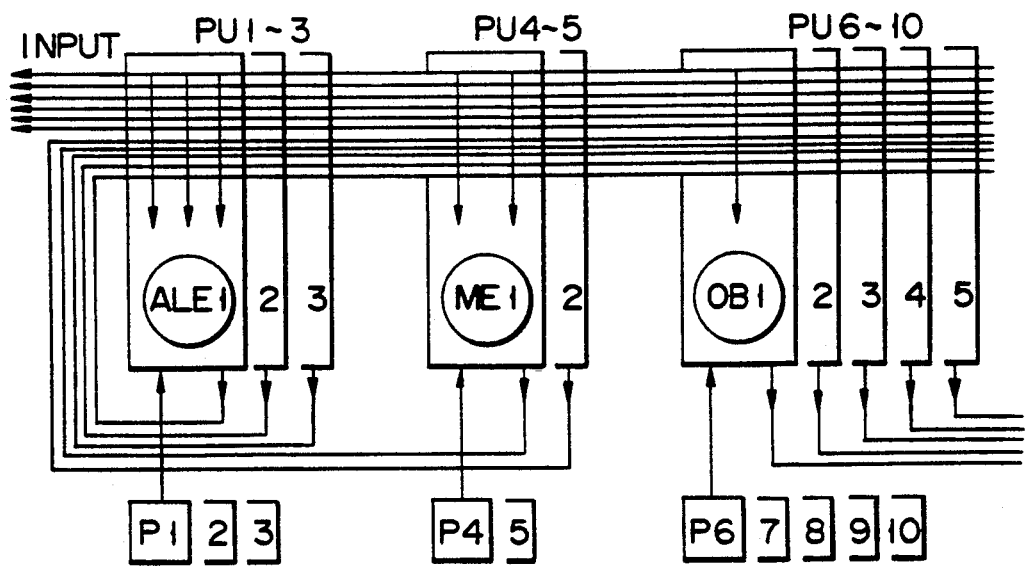
Figure 8C:
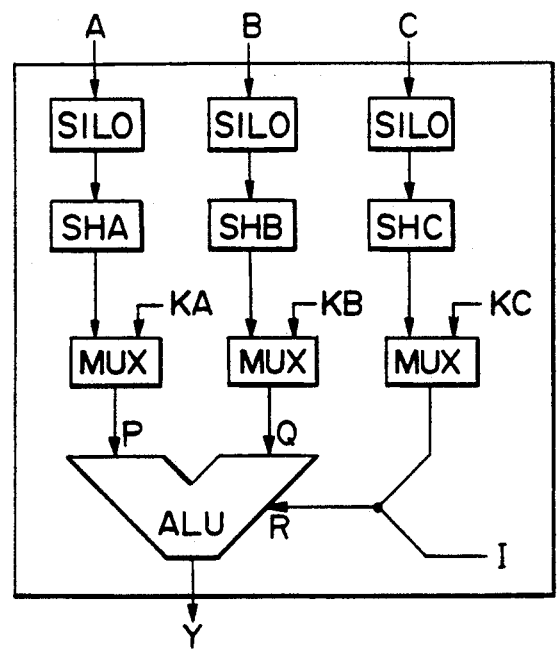
Figure 8D:
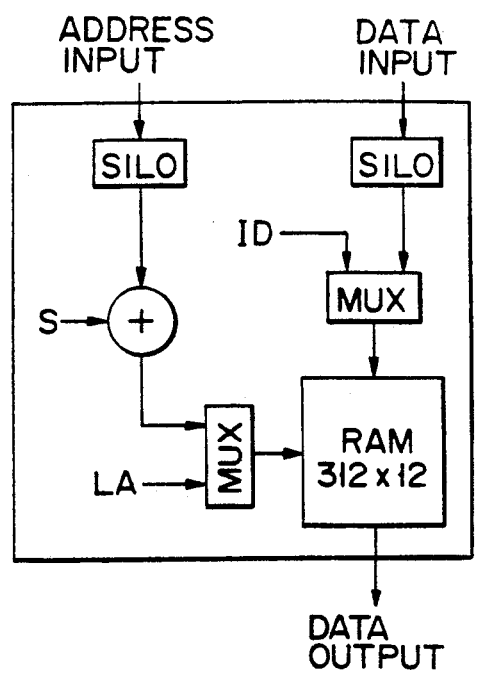
Figure 8E:
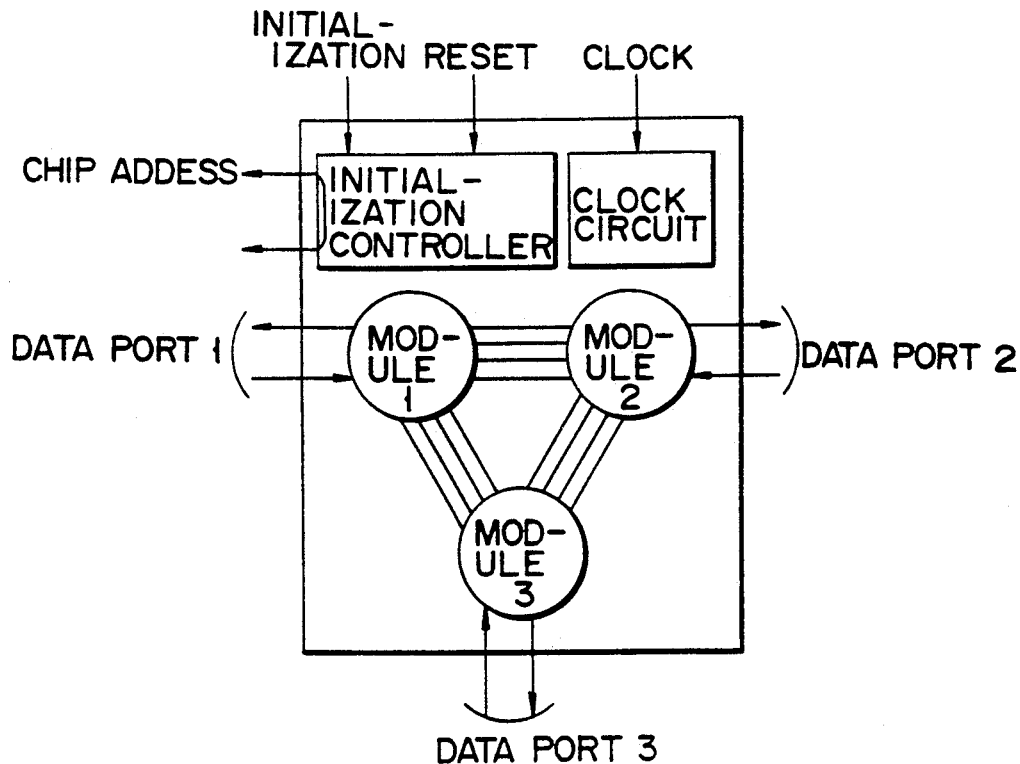

FIG. 8B shows an internal structure of a combination of DSP of the type shown in FIG. 8A. In FIG. 8B, the DSP has three systems of ALEs (arithmetic & logic elements) for performing arithmetic processing, two systems of MEs (memory elements) serving as memory sections each comprising a 512×12 static RAM, and five systems of OBs (output buffers). P1 to P10 store programs for controlling the respective systems of ALEs, MEs, and OBs. P1 to P10 are RAM-type program memories. CPU 30, as shown in FIG. 6, reads the programs stored in ROM 31, and the programs thus read are written into P1 to P10 through I/F 41. FIGS. 8C and 8D show detailed structures of the ALE and the ME, respectively. FIG. 8E equivalently illustrates a case wherein a plurality of DSPs are connected. The actual configuration of the ALE is shown in FIG. 8C of the present application. The operations the ALU performs are detailed, for example, in Table 1 in Phillips, "A General-Purpose Programmable Video Signal Processor", by Roermund et al, at page 251. For example, the 3-bit instruction which ALE1 (FIG. 8B) is to execute is input from P1 as data I, while three operands are input from A, B, and C. The ALU effects the operations specified in Table 1 on these operands.

FIG. 8A to 8E detail the general structure of a DSP, such as the Phillips DSP detailed in the above-cited article as an example.

FIG. 9 illustrates the internal structure of the DSP rewritten as an equivalent diagram for the sake of easy understanding. Signals supplied to five input ports 43 are supplied to selectors 44 and 45, and a switch circuit 46. The selector 44 selects two out of five input signals, and outputs the selected signals. One of the two signals selected by the selector 44 is supplied to one input terminal of an arithmetic circuit 47. One of the other signals selected by the selector 44, and an output from an arithmetic data memory 48 is selected by a switch 49, and is selectively supplied to the other input terminal of the arithmetic circuit 47. The selector 45 selects one of the input five signals, and outputs the selected signal. One of the selected signals and the output from the arithmetic circuit 47 is selected by a switch 50, and is selectively supplied to the arithmetic data memory 48.

The outputs from the arithmetic circuit 47 and the arithmetic data memory 48 are input to the switch circuit 46. The switch circuit 46 selects an arbitrary five out of seven input signals, and outputs them to output ports 51.

In FIG. 9, reference numeral 52 denotes a program memory for storing programs for executing various arithmetic processing operations. A program read out from the program memory 52 is supplied to and decoded by a program decoder 53, and is then used for controlling the selectors 44 and 45, the switch circuit 46, the arithmetic circuit 47, the arithmetic data memory 48, and the like. The program memory 52 receives an output from a program counter 54 as an address. The program counter 54 counts clocks after a reset signal is input, thereby generating an address.

For example, when five signals a to e are supplied to the input ports 43, and an arithmetic result of a x c is to be output from the uppermost terminal in FIG. 9 of the output ports 51, the selector 44 selects the signals a and c. In this case, the switch 49 is switched to supply the signal c selected by the selector 44 to the arithmetic circuit 47. The arithmetic circuit 47 performs an arithmetic operation of signal a x signal c. The arithmetic result from the arithmetic circuit 47 is then output from the uppermost terminal in FIG. 9 of the output ports 51 via the switch circuit 46. Such an arithmetic processing operation is executed by controlling respective units on the basis of a control signal output from the program decoder 53.

As is shown in FIG. 9, five input ports 43 and five output ports 51 are used. The purpose of using these ports is to exchange data among the upper, lower, left and right DSPs in the case where DSPs are arranged in rows and columns, as is shown in FIG. 6. In the system of FIG. 6, however, only four input ports 43 and only four output ports 51 suffice for DSPs 11 to mn. In either the system of FIG. 9 or the system of FIG. 6, all input ports and all output ports may not be used, depending on the operations to be performed by the system. In other words, how many input ports and how many output ports need be used depends on the operations the system is to perform.

As discussed above, with reference to FIG. 9, the result of multiplying a by c is output from the output port 51. This is because this multiplication is an operation frequently carried out. Note that DSP 36, shown in FIG. 12, performs part of this operation (by contrast, DSPs 22 to 24 and DSPs 32 to 34, all shown in FIG. 14 may, for example, effect the addition of a+c). The program of performing the multiplication of a×c in the system shown in FIG. 9 will now be explained.

As is evident from FIG. 9, selector 44 has two output terminals a and c; selector 45 has one output terminal; and switch circuit 46 has five output terminals and seven input terminals. Program memory 52 has a storage capacity of 256 words, each consisting of 8 bits, and arithmetic data memory 48 has a storage capacity of 8 words, each consisting of 8 bits. The instructions used have word lengths of 8 bits. Examples of some of these instructions are specified in FIG. 23. Program memory 52 stores the program codes for achieving the multiplication of a×c, which are specified in the table of FIG. 24. The multiplication is accomplished as follows.

First, when the output of program counter 54 changes to n, data "80" is read from program memory 52, shown in FIG. 24, and supplied to program decoder 53. Upon receipt of this data, decoder 53 controls selector 44 such that data "a" is output from the output terminal a of selector 44. When the output of counter 54 increases to n+1, data "8A" is read from program memory 52 and is input to program decoder 53. In response to this data, decoder 53 controls selector 44 such that data "c" is output from the terminal c of the selector 44. Thereafter, when the output of counter 54 increases to n+2, data "C0" is read from program memory 52 and input to program decoder 53. Then, program decoder 53 makes arithmetic circuit 47 perform the multiplication of a×c. The result of this operation is input to switch circuit 46 through an input terminal. Further, when the output of counter 54 increases to n+3, data "9D" is read from memory 52 and input to decoder 53. Program decoder 53 causes circuit 46 to output the result through an output terminal of switch circuit 46.

A means for storing a plurality of programs to be executed by the DSP, and a means for switching the plurality of programs at timings selected with a sync signal will now be described below. As shown in FIG. 10, the program memory 52 has an area 52a for storing a video signal processing program, and an area 52b for storing a ghost cancel program. The program counter 54 also includes a counter 54a capable of addressing the area 52a of the program memory 52, and a counter 54b capable of addressing the area 52b. Address signals output from the two counters 54a and 54b are selectively supplied to the program memory 52 through a switch 55.

The switch 55 is switched on the basis of a switching signal output from the control signal generator 42 shown in FIG. 6. This switching signal goes to L (LOW) level during the blanking period, and goes to H (HIGH) level during the video period, as shown in FIG. 11. When the switching signal is at H level, it switches the switch 55 so as to input an address signal output from the program counter 54a to the program memory 52. When the switching signal is at L level, it switches the switch 55 so as to input an address signal output from the program counter 54b to the program memory 52. For this reason, during the video period, the content of the area 52a of the program memory 52 is read out on the basis of the address signal output from the program counter 54a, and the arithmetic operations of the DSP are executed based on the readout content, thereby executing video signal processing. On the other hand, during the blanking period, the content of the area 52b of the program memory 52 is read out on the basis of the address signal output from the program counter 54b, and the arithmetic operations of the DSP are executed based on the readout content, thereby executing ghost cancel processing.

Figure 25:
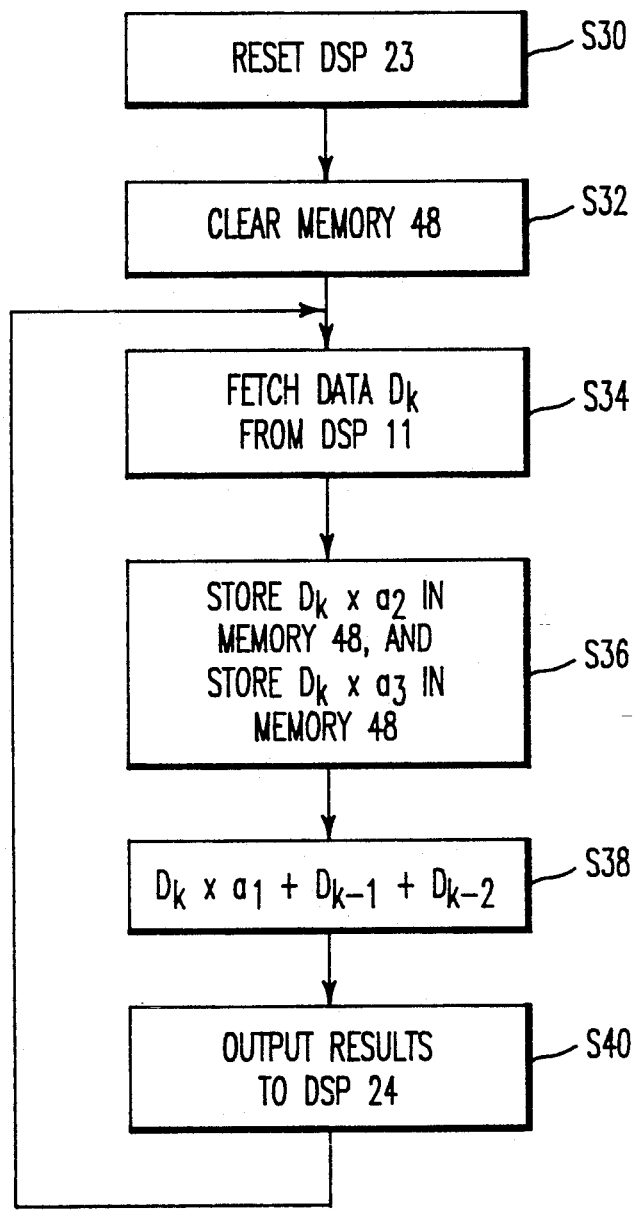
FIG. 25 is a flow chart showing a luminance signal extracting processing.
Figure 26:
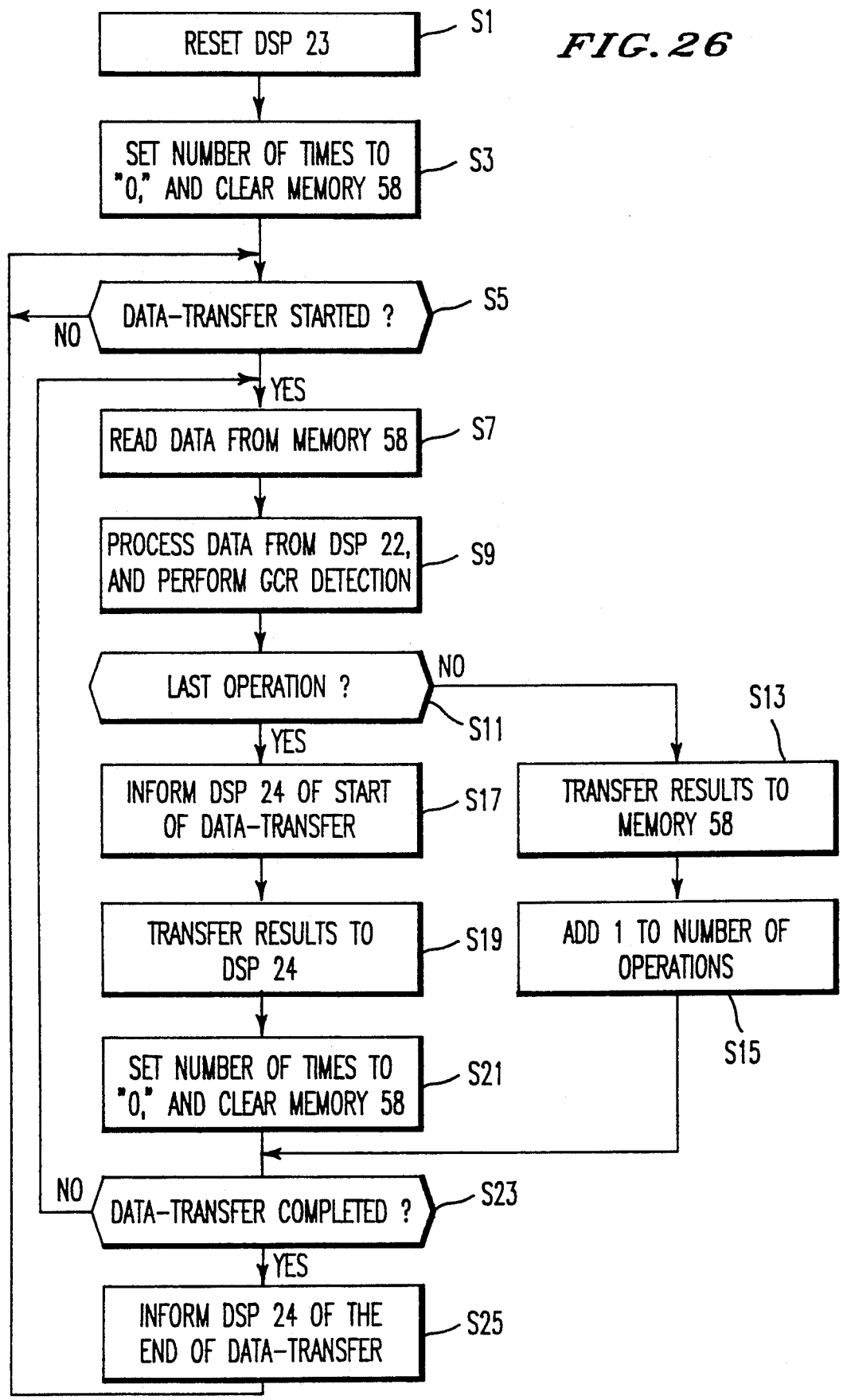
FIG. 26 is a flow chart showing GCR detection.

With reference to the processing effected by DSP 23 shown in FIG. 14, DSP 23 extracts luminance signals during the display period under control of a program stored in program area 52a, the program being illustrated in the flowchart of FIG. 25, and performs part of GCR detection during the non-display or blanking period under control of a program stored in program area 52b, the program being illustrated in the flowchart of FIG. 26.

As discussed above, the GCR is detected during the non-display or blanking period under control of a program stored in program area 52b. This program stored in program area 52b is detailed in FIG. 26. As shown in FIG. 26, in a step S1 the DSP 23 is reset. Then, in step S3 memory 58 is cleared and the number of times is set to "0". Then, in step S5 it is determined whether a data-transfer is started. If data-transfer has started, then, as shown in step S7, data is read from memory 58. Then, data is processed from DSP 22 and GCR detection is performed, as indicated in step S9. In step S11, it is then determined whether this is the last operation. If this is not the last operation, then the system proceeds to step S13 where results of the processing are transferred to memory 58. Then, in step S15 "1" is added to the number of operations. The system then proceeds to step S23 where it is determined whether data-transfer is completed.

If in step S11 it is determined that it is the last operation, the system then proceeds to step S17. At S17, DSP 24 is informed of the start of data-transfer. Then, in step S19 the results of the processing are transferred to DSP 24. In step S21 the number of times is then again set to "0" and memory 58 is cleared. The system is then again at step S23. In step S23 it is determined whether data-transfer is completed. If data-transfer is completed the system proceeds to step S25 where DSP 24 is informed of the end of data-transfer. If data-transfer is not completed, the system proceeds back to step S9. After S25, the system proceeds back to step S5.

Furthermore, as discussed above, luminance signals are extracted during a display period under the control of the program stored in program area 52a, this program being shown in FIG. 25. As shown in FIG. 25, during luminance extracting, DSP 23 is initially reset, as shown in step S30. Then, memory 48 is cleared, as shown in step S32. The system then proceeds to step S34 where data is fetched from DSP 11. Then, data $D_k \times a_2$ is stored in memory 48 and data $D_k \times a_3$ is stored in memory 48, as shown in Step S36. Then, in step S38 processing is performed on the data $D_k \times k_1 + D_{k-1} + D_{k-2}$. Then, the system proceeds to step S40 where the results are output to DSP 24. Under this processing, luminance extracting can be performed during the display period.

Figure 27:
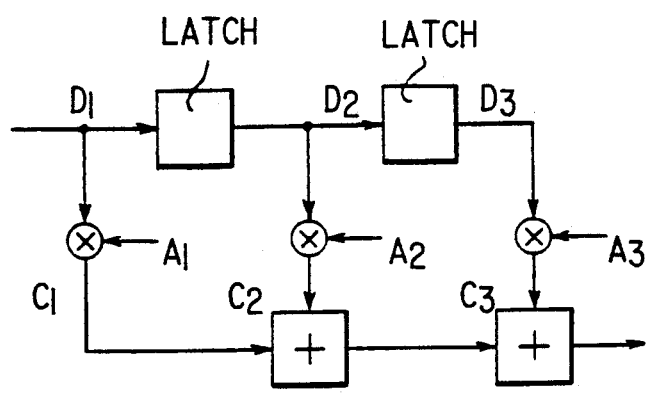
FIG. 27 shows a circuit for GCR detection.

FIG. 27 shows a hardware diagram which is suitable to effectuate DSP 23 to detect GCR during the non-display or blanking period, and shows tap coefficients a1, a2, and a3, two latches and two adders. The latching timing is in units of pulse-periods of the clock signal having a frequency of 4 fsc (fsc=3.57945 MHz in terms of color subcarrier frequency).

Figure 4:
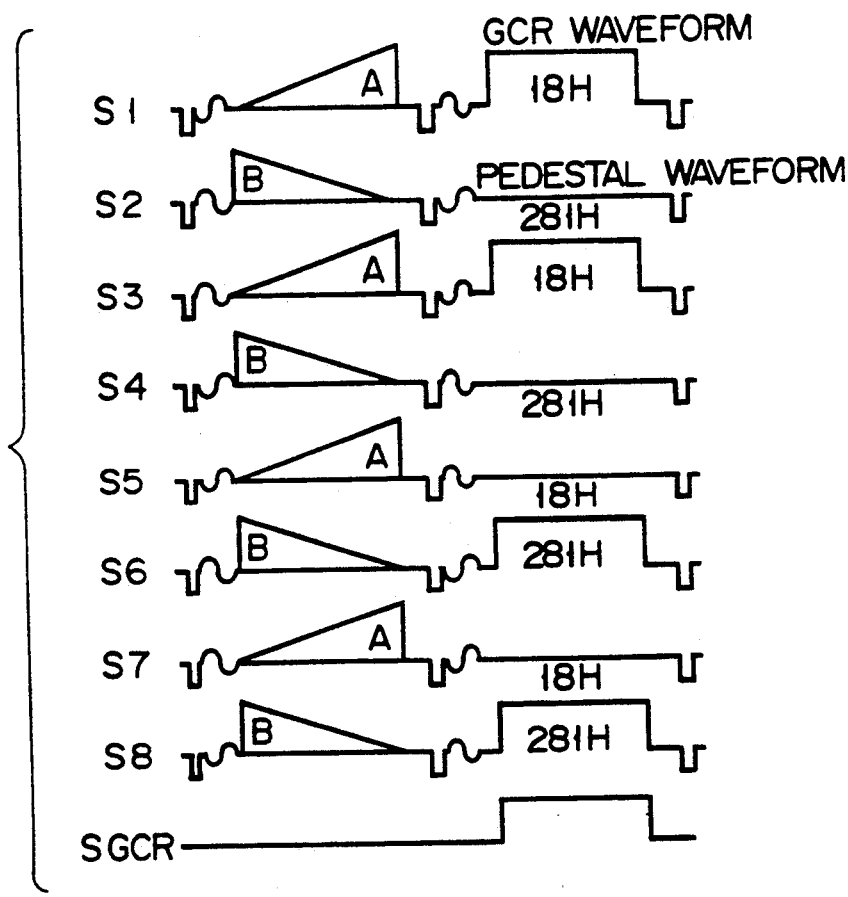
FIG. 4 is a waveform chart for explaining detection of a GCR signal used in the ghost cancel processing.

In this way, as is shown in FIG. 4, DSP 23 extracts luminance signals during the display period and detects GCR during the non-display period, in accordance with the program shown in FIG. 25 and the program shown in FIG. 26, stored in the program areas 52a and 52b of program memory 52, respectively.

More specifically, the program memory 52 has a total capacity of 64 words, and each of the areas 52a and 52b has a capacity of 32 words. When a reset signal is generated, a counter start address of the program counter 54a is set to be a binary value "000000", and a count start address of the program counter 54b is set to be a binary value "100000".

As shown in FIG. 6, the reset signal is supplied from CPU 30 to DSPs 11 to mn via I/F 41. The reset signal shown in FIG. 9 is supplied in the same way. The switching signal described above is directly supplied to a control terminal of the program counter 54b, and is also supplied to a control terminal of the program counter 54a via a NOT gate 56. This is to stop a count operation of one of the program counters 54b and 54a during the count operation of the other counter. Both counters 54a and 54b are binary counters. They differ only in that counter 54a assumes a count-up status during the video period, whereas counter 54b during the blanking period. The TV process program is stored, as an example, at addresses "000000" to "011111" of the program area 52a of program memory 52, and is read out at the timing defined by counter 54a.

When the programs are controlled, as shown in FIG. 10, two different program control operations can be performed in a DSP. FIG. 10 exemplifies a switching operation of two programs. A switching operation of three or more programs can be realized by the same principle, as a matter of course. For example, a switching operation of four programs can be easily realized, in such a manner that four program counters are arranged, and two systems of switching signals are prepared to obtain binary codes.

As discussed above, as shown in FIG. 10, data stored in program area 52b and data stored in program area 52a are read out during the blanking period and the video period, respectively, under the control of switching signals. What is read from these areas 52a and 52b are operation codes. Driven by these codes, each DSP can process a plurality of signals in the way described in conjunction with FIGS. 12, 13, and 14.

FIG. 12 shows the principle of arithmetic processing executed when the DSP signal processor 40 executes ghost cancel processing. The content of this ghost cancel processing is the same as that described in the ghost cancel block 21 shown in FIG. 1. Data stored in the input waveform memory 35, the output waveform memory 37, and the reference waveform ROM 39 are supplied to the DSP m1 via the interface 41, and are divided in units of output data from the memories 35, 37, and 39. The output data from the input waveform memory 35 is supplied to DSPs 22 to 24 constituting a waveform fetching GCR detection block 57, and arithmetic operations are performed using a memory 58 on the basis of processing programs stored in these DSPs 22 to 24, thereby detecting a GCR signal. The output data from the output waveform memory 37 is supplied to the DSPs 32 to 34 constituting a waveform fetching GCR detection block 59, and arithmetic operations are performed using a memory 60 on the basis of processing programs stored in these DSPs 32 to 34, thereby detecting a GCR signal.

The data stored in memories 35 and 37 is of the same type as in the conventional system, as is described above on page 8, lines 4 to 12 of the specification, and memory 39 is the same as discussed above on page 8, lines 15 to 18 of the specification. The data stored in memories 35, 37, and 39 are stored in units of 8-bit words. Both memories 35 and 37, both for storing GCR signals, are 1024-word RAMs. By contrast, memory 39 is a 128-word ROM. The waveforms data items 18H and 281H, both shown in FIG. 4, are stored into memories 35 and 37, respectively; the waveform data shown in FIG. 5B is stored into memory 39.

Figure 28:
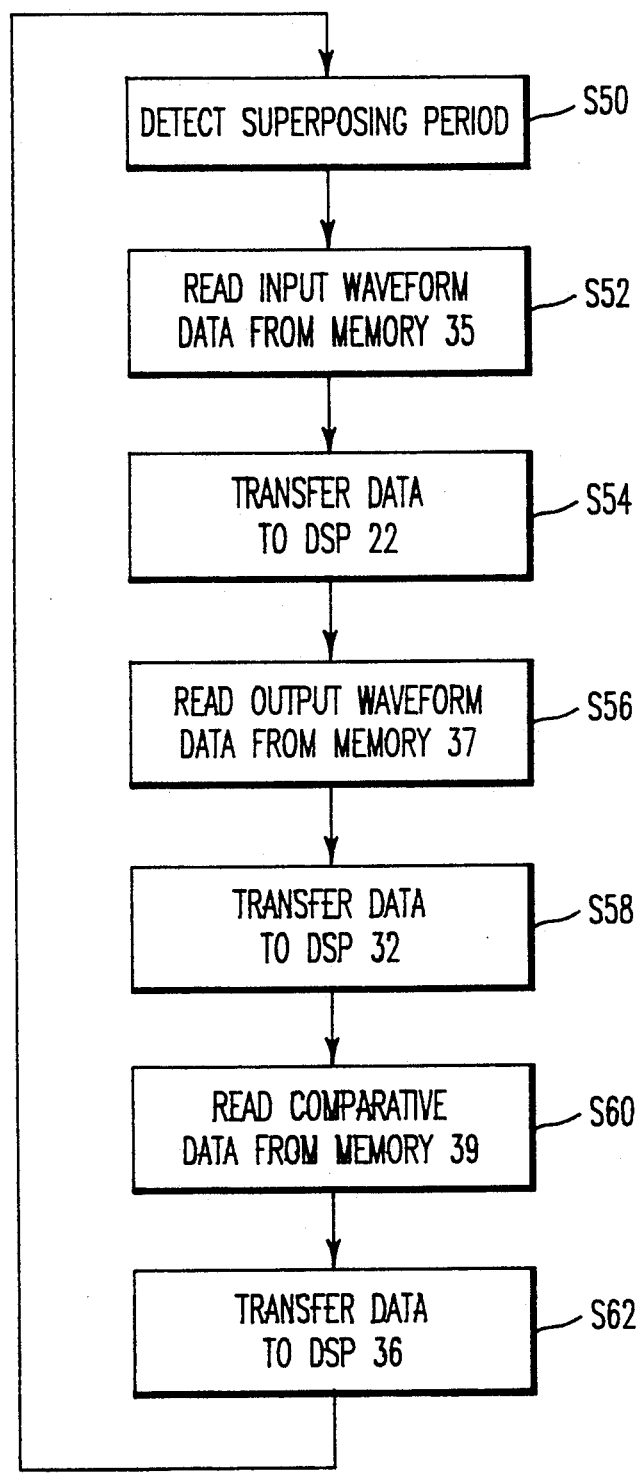
FIG. 28 is a flow chart showing operation of a DSP of the present invention.

The means for storing data into memories 35 and 37 is similar to that discussed above, with reference to FIGS. 1, 21 and 22. FIG. 28 is a flowchart representing the operation of DSPm1. As shown in FIG. 28, in a step S50 a superposing period is detected. The system then proceeds to step S52 where input waveform data is read from memory 35. In step S54, the system then transfers data to DSP 22. The system then proceeds to step S56 where an output waveform data is read from memory 37. In step S58, this output waveform data is then transferred to DSP 32. The system then proceeds to step S60 where comparative data is read from memory 39. The system then proceeds to step S62 where this comparative data is transferred to DSP 36. The program for operating DSPm1 in this way is stored in program memory 52 shown in FIG. 9.

DSPs 22 to 24 and DSPs 32 to 34 detect GCR waveforms by the same method as described above on page 9, lines 3 to 8. More specifically, they effect the operations shown in FIG. 4, extracting GCR waveforms only. In other words, they remove the color burst of any line superposed on the waveform of the immediately preceding line.

Figure 29:
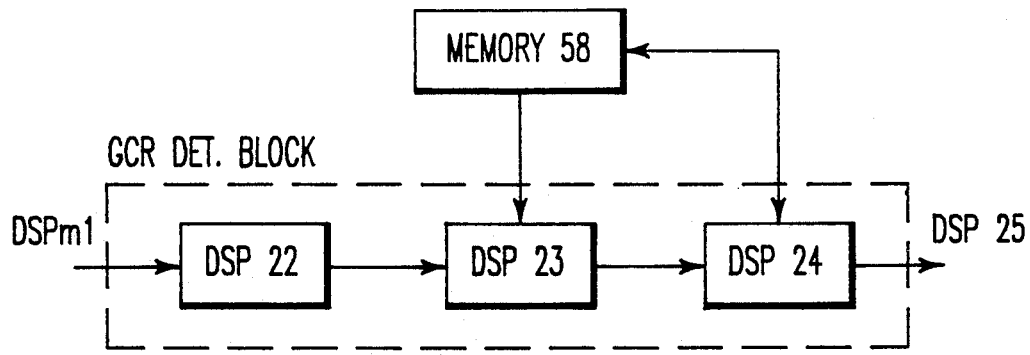
FIG. 29 is a diagram showing the correction between DSPs of the present invention.

DSPs 22, 23, and 24 are connected in the manner specified in FIG. 29, thus forming a GCR-detecting block. As shown in FIG. 29, in a GCR-detection block, DSP 22, DSP 23 and DSP 24 are connected serially. Memory 58 is connected to DSP 23 and DSP 24. The output of the GCR detection block then goes to DSP 25. DSPs 22 and 24 operate as is depicted by the flowcharts of FIGS. 30 and 31.

Figure 30:
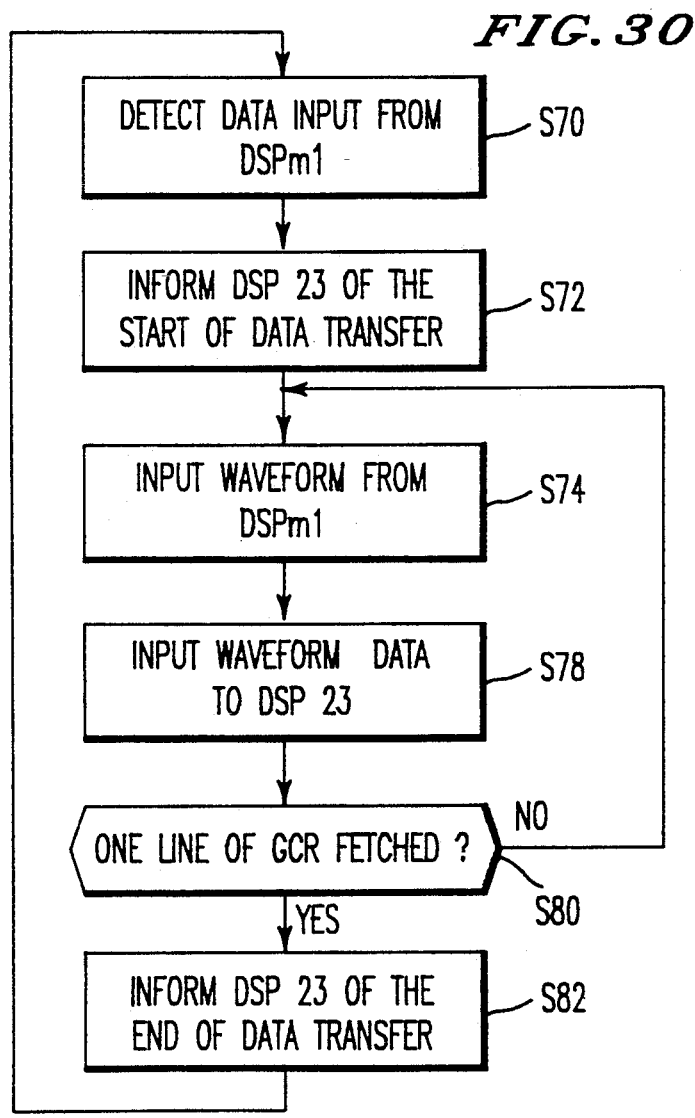
FIG. 30 is a flow chart showing operation of DSP 22 of the present invention.

As shown in FIG. 30, in a step S70 data input from DSPm1 is detected. The system then proceeds to step S72 where DSP 23 is informed of the start of data-transfer. The system then proceeds to step S74 where an input waveform is input from DSPm1. The system then proceeds to step S78 where this input waveform data is input to DSP 23. The system then proceeds to step S80 where it is determined whether one line of GCR has been fetched. If the result in step S80 is no, the system then proceeds back to step S74. If in step 80 it is determined that one line of GCR has been fetched, the system then proceeds to step S82, where DSP 23 is informed of the end of data-transfer.

For the operation of DSP 24, as shown in FIG. 31, in a step S90 DSP 24 is reset. The system then proceeds to step S92 where it is determined whether data-transfer has started. If data-transfer has started, the system proceeds to step S94, where data is read from DSP 23. The system then proceeds to step S98, where this data is multiplied by ¼. The system then proceeds to step S100, where the results of this processing are transferred to memory 58. The system then proceeds to step S102 where the results are transferred to DSP 25. The system then proceeds to step S104 where it is determined whether data-transfer is completed. If data-transfer is not completed, the system proceeds back to step S94. If data-transfer is completed, the system will proceed back to step S92. DSP 23 performs the operation defined by the flowchart of FIG. 26. The GCR-detecting block outputs the results of the following computation:

$$SGCR = (\tfrac{1}{4})\{(S1-S5)+(S6-S2)+(S3-S7)+(S8+-S4)\}$$

The data thus obtained and output, is called "SGCR."

DSP 22 fetches the input waveform data from memory 35 via DSP m1, one line (910 8-bit words) at a time, and transfers this data to DSP 23. Also, DSP 22 detects the receipt of each line of GCR data.

To obtain SGCR, DSP 23 performs the following operations:

0 . . . Transfer data S1 to memory 58
1 . . . Take S2 from S1, and transfer S1−S2 to memory 58
2 . . . Perform S1−S2+S3, and send the result to memory 58

7 . . . Perform S1−S2+S3−S4−S5+S6−S7+S8, and transfer the result to DSP 24

DSP 24 multiplies the input data by ¼, thus obtaining SGCR. SGCR is transferred to DSP 25 and also to memory 58.

DSPs 32 to 34 carry out operations similar to those DSPs 22 to 24 perform. The only difference is that DSPs 32 to 34 detect GCR from the data stored in memory 35, whereas DSPs 32 to 34 detect GCR from the data stored in memory 37.

The GCR signals output from the waveform fetching GCR detection blocks 57 and 59 are respectively supplied to the DSPs 25 and 35 respectively constituting difference arithmetic blocks 61 and 62, and difference signals are generated on the basis of processing programs stored in the DSPs 25 and 35.

DSP 25 finds the differences among the SGCRs of the input waveform, extracted by DSPs 22, 23 and 24. On the other hand, DSP 35 obtains the differences among the SGCRs of the output waveform, extracted by DSPs 32, 33 and 34. Since DSP 25 processes the waveforms to be supplied to transversal filter 34, i.e., waveforms not equalized yet, it outputs a signal accompanied by a ghost signal as is shown in FIG. 5A. The difference-finding operation of DSP 25 is best defined as follows:

$$x_k = X_{k+1} - X_k$$

where $x_k$ is a difference, $X_k$ is data showing GCR at point k, and $X_{k+1}$ is data showing GCR at the point one-clock cycle (about 70 nsec) away from point k.

The operation of DSP 25 can be understood from the flowchart of FIG. 32. As shown in FIG. 32, in a step S110 DSP 25 is reset. The system then proceeds to step S112 where DSP is cleared for storing $X_k$. The system then proceeds to a step S114 where the data $X_{k+1}$ is fetched from DSP 24. The system then proceeds to step S116 where data $X_k$ is read from the DSP internal memory. The system then proceeds to step S118 where the processing $X_{k+1} - X_k = X_k$ is performed and then data $X_k$ is transferred to DSP 26. The system then proceeds to step S120 where data $X_{k+1}$ is transferred to the DSP internal memory. The system then proceeds to step S122 where it is determined whether one line of data has been transferred. If it is determined that one line of data has not been transferred, the system proceeds back to step S114. If it is determined that one line of data has been transferred to step S122, the system proceeds back to step S112. DSP 25 finds the differences among SGCRs extracted by DSPs 22, 23 and 24, in order to filter out unnecessary DC components so that DSP 26 may remove ghost components successfully. As is evident from FIG. 5A, the results of the operation of DSP 25 are only a waveform defined as (sin x)/x and ghost components.

DSP 35 obtains the differences among SGCRs in the same way as DSP 25 does. But, DSP 35 finds the difference among the SGCRs of the output waveform data, not those of the input waveform data which DSP 25 finds. The "output waveform data" is the data which has been equalized by transversal filter 34. The operation, which DSP 35 carries out to find the differences among SGCRs, is as follows:

$$y_k = Y_{k+1} - Y_k$$

where $y_k$ is difference, $Y_k$ is data showing GCR at point k, and $Y_{k+1}$ is data showing GCR at the point one-clock cycle (about 70 nsec) away from point k.

Thereafter, the input waveform difference signal output from the difference arithmetic block 61 is supplied to the DSP 26 constituting a peak detection block 63, thus generating peak position data. The peak position data, the output waveform difference signal output from the difference arithmetic block 62, and the output data from the reference waveform ROM 39 obtained from the DSP m1 are supplied to an error detection block 64 constituted by the DSP 36, and an error calculation is performed on the basis of the peak position data.

The error detection block 64 of DSP 36 detects error $e_k$, which is represented as follows:

$$e_k = y_k - r_k.$$

Since $y_k$ is scarcely equalized during the first phase of the equalization process, it can be regarded as showing the waveform illustrated in FIG. 5A. Data $r_k$ represents the waveform shown in FIG. 5B, and data $e_k$ the waveform shown in FIG. 5C. Data $r_k$ is comparative data stored in RAM 39, and consists of 128 8-bit items sampled out at intervals of 70 nsec, of which the center item is the difference data item of $(\sin x)/x$.

Ghost cancelling is a control process for reducing $e_k$ to zero, or making $y_k$ equal to $r_k$. Data $r_k$, shown in FIG. 5B, shows an ideal waveform which has no ghost. The TV transmission station transmits signals having waveforms substantially identical to the ideal waveform, by virtue of the compensating process performed in the station. In the TV receiving station, transversal filter 34 is controlled to make $y_k$ equal to $r_k$, thereby obtained ideal, ghost-free waveforms. Data $e_k$ consists of 910 8-bit words.

An error signal calculated by the error detection block 64 is supplied to a correlation arithmetic block 65 constituted by the DSP 36, and correlation arithmetic processing is executed by utilizing the input waveform difference signal output from the difference arithmetic block 61. The correlation arithmetic processing result is supplied to a multiplication block 66 constituted by the DSP 37, and is multiplied with a predetermined constant.

The correlation arithmetic block 65 of DSP 36 finds the following correlation:

$$d_k = \sum_{j=p-a}^{p+a} x_j \times e_{j+k}$$

where p is the address of the peak point of $x_k$, and a is an integer which is usually $-64$ or $+64$.

Multiplication block 66, the block next to block 65, performs the following multiplication:

$$a_p \times d_{k,n}$$

The addition block 67 of DSP 37 performs the following addition, thereby obtained a new tap coefficient $c_{k,n+1}$:

$$c_{k,n+1} = c_{k,n} - a_p \times d_{k,n}$$

where $c_{k,n}$ is the kth tap coefficient obtained after control has been repeated n times, and $a_p$ is an adjustment constant or the above referred to "predetermined constant".

This predetermined constant $a_p$ is a factor determining how many times block 65 needs to repeat operations to find an optimal tap coefficient. According to the present invention, $a_p$ has the value of 1/100 to 1/10. If it is greater than 1/10, oscillation or divergence will take place. The new tap coefficient $c_{k,n+1}$, output from addition block 67, is set in transversal filter 34, and also in coefficient memory 68.

The product is supplied to a subtraction block 67 constituted by the DSP 37, and is subtracted from data from a coefficient memory 68, thereby generating new tap coefficient data. The new tap coefficient is written in the coefficient memory 68, and is set in the transversal filter 34 via the DSP 21. The above-mentioned ghost cancel processing operations are realized by executing an arithmetic operation given by Equation (1) described above during the blanking period as a non-video period.

Figure 13:
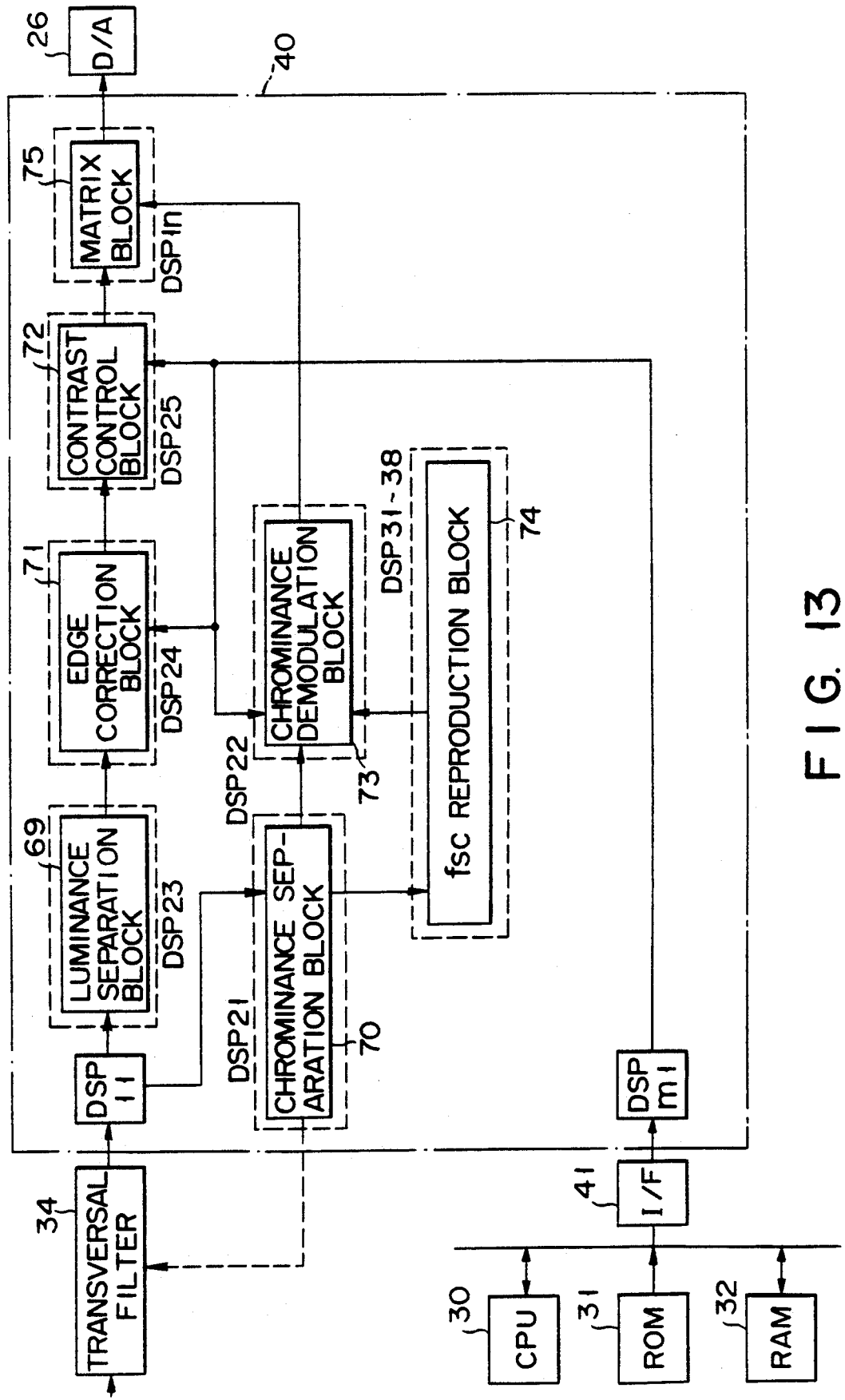
FIG. 13 is a schematic block diagram of video signal processing by the DSP.

FIG. 13 shows the principle of arithmetic processing executed when the DSP signal processor 40 executes video signal processing. A video signal output from the transversal filter 34 is supplied to the DSP 23 constituting a luminance separation block 69 via the DSP 11 serving as an interface, and is also supplied to the DSP 21 constituting a chrominance separation block 70. The luminance separation block 69 separates a luminance signal from the input video signal, and the separated video signal is supplied to the DSP 24 constituting an edge correction block 71 to be subjected to edge correction. An edge correction amount is controlled by transmitting an instruction from the CPU 30 to the edge correction block 71 via the interface 41 and the DSP m1. The edge-corrected luminance signal is supplied to the DSP 25 constituting a contrast control block 72, and is subjected to contrast control. A contrast control amount is controlled by transmitting an instruction from the CPU 30 to the contrast control block 72 via the interface 41 and the DSP m1.

The chrominance separation block 70 separates a chrominance signal from the input video signal. The separated chrominance signal is supplied to the DSP 22 constituting a chrominance demodulation block 73 to be subjected to chrominance demodulation processing, and is also supplied to the DSPs 31 to 38 constituting a chrominance subcarrier reproduction block 74, thus reproducing a chrominance subcarrier fSC. The reproduced chrominance subcarrier fSC is used as a reference signal for the chrominance demodulation processing in the chrominance demodulation block 73. The luminance signal output from the contrast control block 72 and the chrominance signal output from the chrominance demodulation block 73 are supplied to the DSP ln constituting a matrix block 75 to be subjected to matrix processing, thereby generating R, G, and B signals. The R, G, and B signals are output to the D/A converter 26.

FIG. 14 shows processing operations of the DSPs 11 to mn constituting the DSP signal processor 40 in the video signal processing and the ghost cancel processing in contrast to each other. These two processing operations are executed by the processing programs stored in the DSPs 11 to mn, and the processing programs are switched, as has been described above with reference to FIGS. 10 and 11. Thus, control is made such that the ghost cancel processing is executed during the non-video period, and the video signal processing is executed during the video period.

Figure 15:
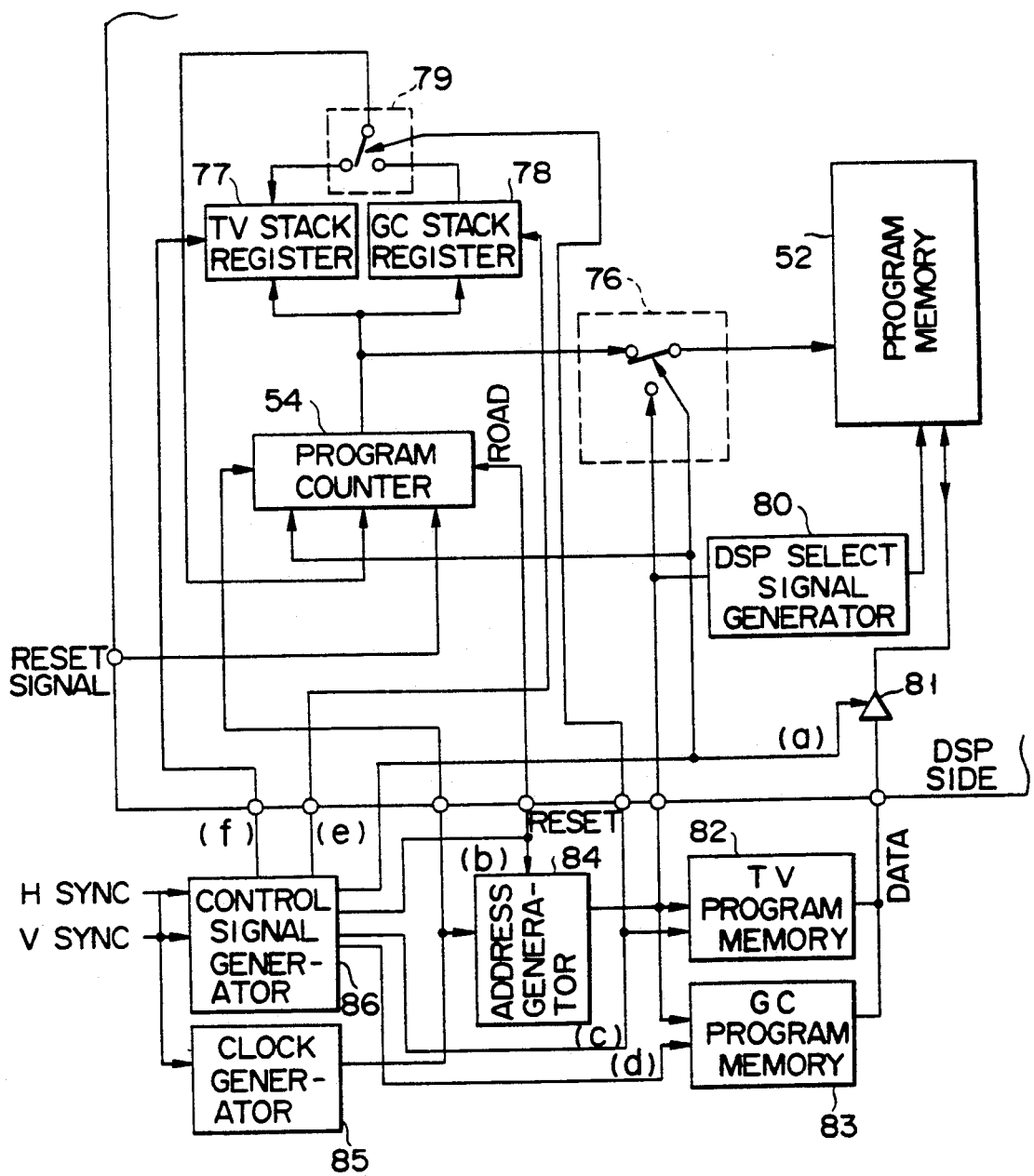
FIG. 15 is a block diagram showing another switching means for a program to be supplied to the DSP.
Figure 16:
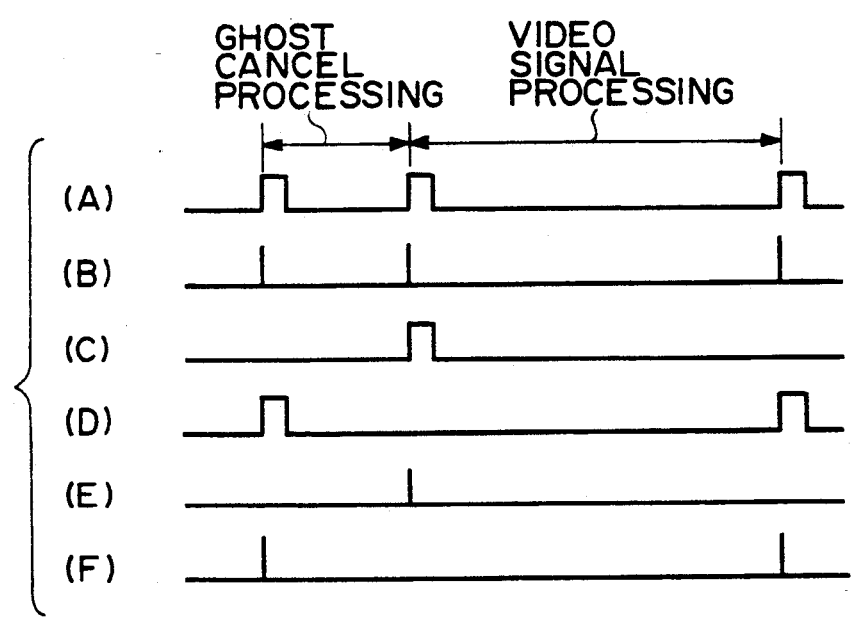
FIGS. 16A to 16F are timing charts for explaining an operation of the switching means shown in FIG. 15.

FIG. 15 shows another arrangement of the means for switching processing programs to be executed by the DSPs to selectively execute the video signal processing and the ghost cancel processing, as shown in FIG. 10. In FIG. 10, the program memory 52 of the DSP stores the video signal processing program and the ghost cancel processing program in the independent areas. In FIG. 15, however, the video signal processing program and the ghost cancel processing program stored in an external memory are selectively loaded in the program memory 52 in the DSP every time processing is executed.

More specifically, in the DSP, an output from the program counter 54 can be supplied to the program memory 52 as an address via a switch 76. The output from the program counter 54 is a latched by a video signal stack register 77, and a ghost cancel stack register 78, and the latched values are selectively fed back to the program counter 54 via a switch 79. In FIG. 15, reference numeral 80 denotes a DSP select signal generator, which outputs a select signal to the program memory 52 to select a DSP in which the processing program is to be written by an external circuit. The processing program input from the external circuit is supplied to the program memory 52 via a gate 81.

A program memory 82 for storing a video signal processing program, and a program memory 83 for storing a ghost cancel processing program are prepared outside the DSP. These program memories 82 and 83 receive an address signal output from an address generator 84. The address signal output from the address generator 84 is supplied to the DSP select signal generator 80 to generate a select signal, and can also be supplied to the program memory 52 via the switch 76. That is, the address signal output from the program counter 54 and the address signal output from the address generator 84 are selectively supplied to the program memory 52 via the switch 76.

The address generator 84 generates the address signal by counting output clocks from a clock generator 85 for generating clocks synchronous with the horizontal sync signal H output from the sync separator 24 shown in FIG. 6. The output clocks from the clock generator 85 are also supplied to the program counter 54 to be counted by it. The horizontal and vertical sync signals H and V output from the sync separator 24 are supplied to a control signal generator 86 to generate various control signals, such as latch signals for the stack registers 77 and 78, switching signals for the switches 76 and 79, a load signal for loading a content of one of the stack registers 77 and 78 selected by the switch 79 to the program counter 54, a reset signal for the address generator 84, an ON/OFF control signal for the gate 81, and the like.

FIGS. 16A to 16F show waveforms of control signals at points (a) to (f) in FIG. 15, respectively. At a start timing of the blanking period, i.e., at a start timing of the ghost cancel processing, since a control signal (a) goes to H level, the switch 76 is switched to input the address signal output from the address generator 84 to the program memory 52, and the gate 81 is enabled. At this time, a control signal (b) goes to H level, and the address generator 84 is reset, and then starts counting. At the same time, a control signal (d) goes to H level, and the program memory 83 is selected and is set in a read enable state. For this reason, the ghost cancel processing program read out from the program memory 83 is sequentially rewritten in the program memory 52 on the basis of the address signal output from the address generator 84. Since a control signal (c) is at L level at this time, the switch 79 is switched to supply the content of the stack register 78 to the program counter 54. When the control signal (b) goes to H level, the content of the stack register 78 is loaded in the program counter 54, and the program counter 54 starts counting from the loaded value. During an H-level period of the control signal (a), the program counter 54 is controlled not to start a count operation.

When the write operation of the ghost cancel processing program in the program memory 52 is completed in this manner, the control signal (a) goes to L level, and the switch 76 is switched to supply the address signal output from the program counter 54 to the program memory 52. For this reason, the ghost cancel processing program is sequentially read out from the program memory 52 on the basis of the address signal output from the program counter 54, and the DSP executes the ghost cancel processing operation during the next blanking period.

After an elapse of the blanking period, since the control signal (a) goes to H level, the switch 76 is switched to supply the address signal output from the address generator 84 to the program memory 52, and the gate 81 is enabled. At this time, the control signal (b) goes to H level, and the address generator 84 is reset, and then starts counting. At the same time, the control signal (c) goes to H level, and the program memory 82 is selected and is set in a read enable state. For this reason, the video signal processing program read out from the program memory 82 is sequentially written in the program memory 52 on the basis of the address signal output from the address generator 84. At this time, since the control signal (c) is at H level, the switch 79 is switched to supply the content of the stack register 77 to the program counter 54. When the control signal (b) goes to H level, the content of the stack register 77 is loaded in the program counter 54, and the program counter 54 starts counting from the loaded value. During an H-level period of the control signal (a), the program counter 54 is controlled not to start a count operation. Since a control signal (e) is at H level in this case, the last value of the program counter 54 during execution of the ghost cancel processing is latched in the stack register 78.

When the write operation of the video signal processing program in the program memory 52 is completed in this manner, the control signal (a) goes to L level, and the switch 76 is switched to supply the address signal output from the program counter 54 to the program memory 52. For this reason, the video signal processing program is sequentially read out from the program memory 52 on the basis of the address signal output from the program counter 54, and the DSP executes the video signal processing operation during the next video signal period.

After an elapse of the video processing period, since the control signal (a) goes to H level, the switch 76 is switched to supply the address signal output from the address generator 84 to the program memory 52, and the gate 81 is enabled. At this time, the control signal (b) goes to H level, and the address generator 84 is reset, and then starts counting. At the same time, the control signal (d) goes to H level, and the program memory 83 is selected and is set in a read enable state. For this reason, the video signal processing program read out from the program memory 83 is sequentially written in the program memory 52 on the basis of the address signal output from the address generator 84. At this time, since the control signal (c) is at L level, the switch 79 is switched to supply the content of the stack register 78 to the program counter 54. When the control signal (b) goes to H level, the content of the stack register 78 is loaded in the program counter 54, and the program counter 54 starts counting from the loaded value. During an H-level period of the control signal (a), the program counter 54 is controlled not to start a count operation. At this time, since a control signal (f) is at H level, the last value of the program counter 54 during execution of the video signal processing is latched by the stack register 77. The above-mentioned operations are repeated, and the ghost cancel processing and the video signal processing are alternately executed.

Figure 17:
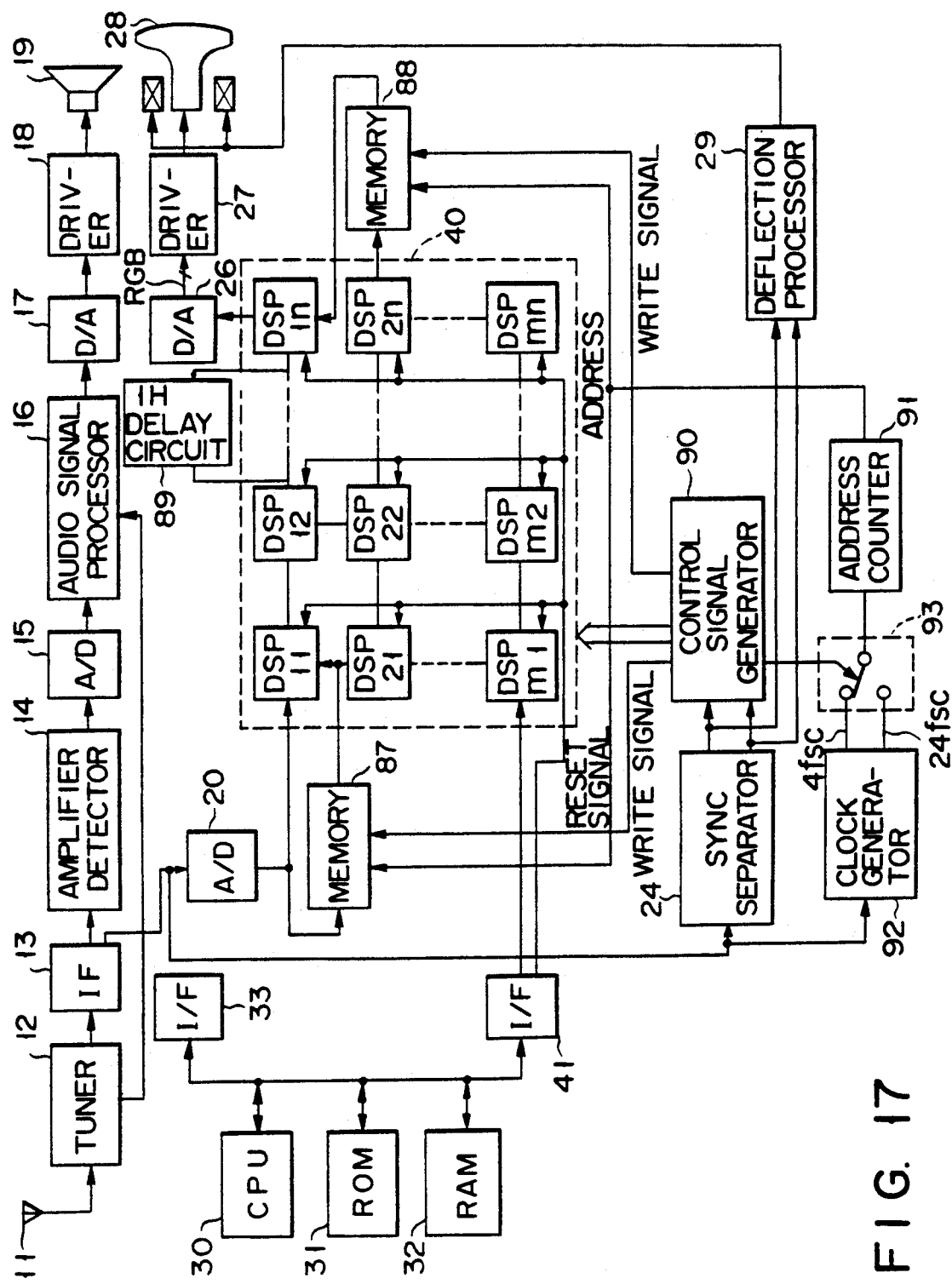
FIG. 17 is a block diagram showing another embodiment of the present invention.

Since processing programs are switched by utilizing the plurality of DSPs 11 to mn, the ghost cancel processing and the video signal processing can be efficiently realized. Signal processing operations which can be executed by utilizing the plurality of DSPs 11 to mn are not limited to the ghost cancel processing and the video signal processing in the above-mentioned embodiment. As shown in FIG. 17, luminance signal processing and chrominance signal processing may be executed. The same reference numerals in FIG. 17 denote the same parts as in FIG. 6. A video signal converted into a digital signal by the A/D converter 20 is supplied to the DSP 11 in the DSP signal processor 40, and is also supplied to a video signal compression memory 87. A compressed chrominance signal output from the DSP 2n in the DSP signal processor 40 is supplied to a memory 88 to be subjected to expansion processing for restoring an original rate and timing. Thereafter, the processed signal is subjected to a matrix arithmetic operation with a luminance signal in the DSP ln, and the arithmetic processing result is output to the D/A converter 26. A 1 H delay circuit 89 arranged in the DSP signal processor 40 is used to synchronize a phase of the luminance signal with a timing of the chrominance signal.

The horizontal and vertical sync signals H and V output from the sync separator 24 are supplied to a control signal generator 90. The control signal generator 90 generates various control signals described above for switching the processing programs of the DSPs 11 to mn on the basis of the input horizontal and vertical sync signals H and V, and also generates write signals for writing data in the memories 87 and 88. The address signals to be supplied to the memories 87 and 88 are generated by an address counter 91. The address counter 91 selectively receives an expansion clock having a frequency 4 fSC, and a compression clock having a frequency 6×4 fSC generated by a clock generator 92 via a switch 93, and generates address signals corresponding to compression and expansion operations in the memories 87 and 88. The switch 93 is switched by a switching signal generated by the control signal generator 90.

Figure 18:
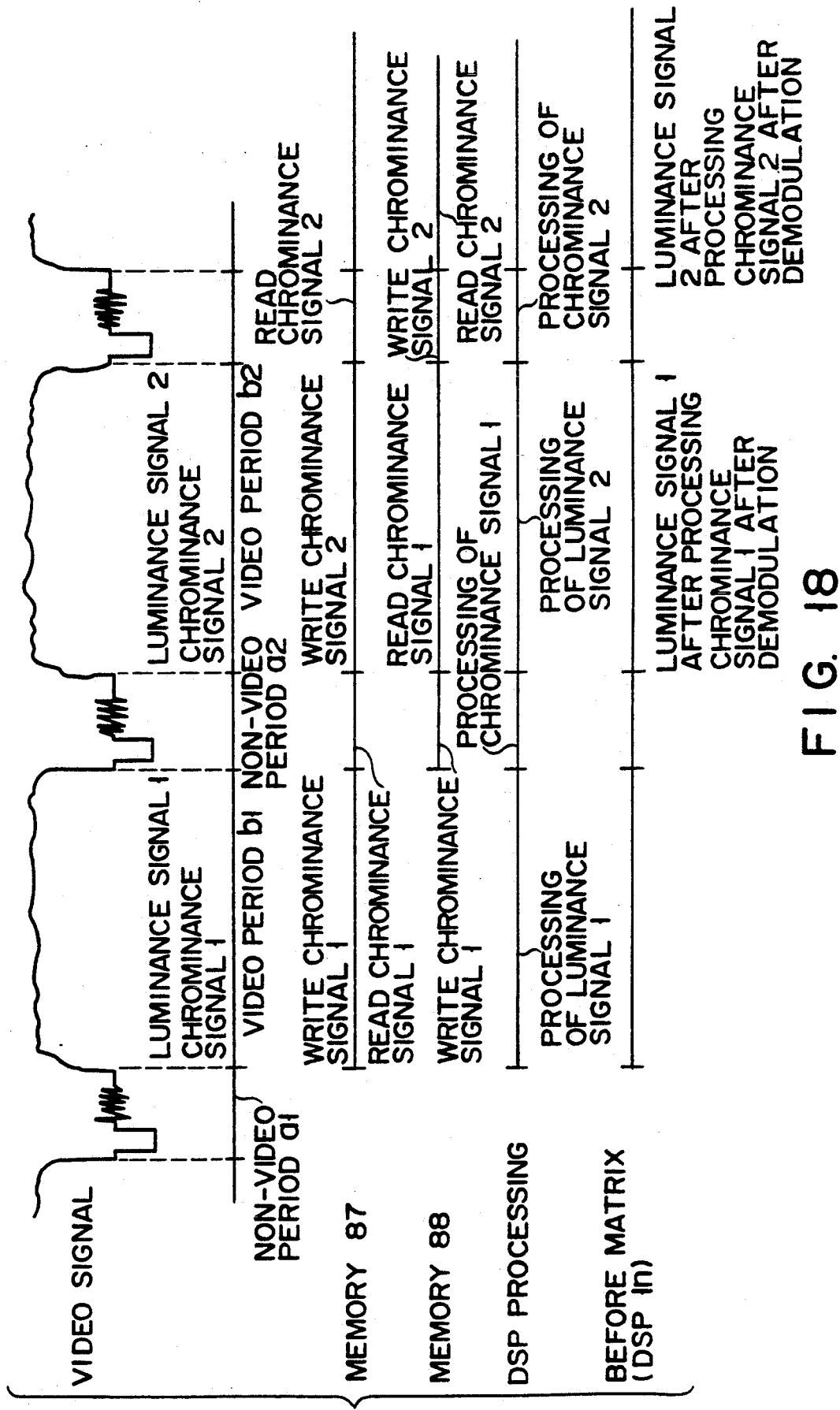
FIG. 18 is a view for explaining an operation of the embodiment shown in FIG. 17.

The operation will be described below with reference to the timing chart shown in FIG. 18. During a video period b1 of a video signal shown in FIG. 18, a chrominance signal 1 is written in the memory 87. In practice, data written in the memory 87 is not converted to a chrominance signal yet at this time, but has a format of a video signal. In this case, assume that data written in the memory 87 is subjected to processing such as chrominance demodulation in future, and is converted into the chrominance signal 1. In this case, the switch 93 is switched to supply a 4 fSC clock to the address counter 91. The address counter 91 generates an address signal on the basis of the 4 fSC clock, and the chrominance signal 1 is written in the memory 87. A write rate of the chrominance signal 1 in the memory 87 on the basis of the address signal generated based on the 4 fSC clock is the same as that of a sampling clock of the A/D converter 20. At this time, the DSP signal processor 40 is executing processing of a luminance signal 1 during the video period b1 on the basis of a vide signal supplied from the A/D converter 20 to the DSP 11.

After the chrominance signal 1 is written in the memory 87, the switch 93 is switched to supply a 6×4 fSC clock to the address counter 91 simultaneously with the beginning of a non-video period a2. Thus, the address counter 91 generates an address signal which is generated based on the 6×4 fSC clock, and works at a compression frequency. For this reason, the compressed chrominance signal 1 is read out from the memory 87, and is output to the DSP 11. At this time, the programs of the DSPs 11 to mn ar switched to execute signal processing for demodulating the chrominance signal. When the chrominance signal 1 is output from the DSP 2n, it is written in the memory 88 at the same rate. When the next video period b2 starts, the switch 93 is switched to supply the 4 fSC clock to the address counter 91. The chrominance signal 1 is read out from the memory 88 on the basis of the address signal generated by the address counter 91 based on the 4 fSC clock. More specifically, the compressed chrominance signal 1 written in the memory 88 is expanded and is restored to a regular rate signal during the video period b2. At this time, a chrominance signal 2 during the video period b2 is written in the memory 87. Thereafter, the same operations as described above are repeated, and the luminance signal processing and the chrominance signal processing are alternately executed by the single DSP signal processor 40.

FIGS. 19A and 19B respectively show the principles of arithmetic processing operations executed when the luminance signal processing and the chrominance signal processing are executed by the DSP signal processor 40. In FIG. 19A, a digital video signal output from the A/D converter 20 is supplied to the DSP 11 constituting a luminance separator 94, and a luminance signal is separated from the input video signal. The luminance signal is supplied to the DSP 12 constituting an edge correction circuit 95 to be subjected to edge correction processing. The processed signal is then supplied to the DSP 2n constituting a contrast adjustment circuit 96 to be subjected to contrast adjustment processing. Thereafter, the processed signal is supplied to the DSP ln constituting a matrix circuit 97 via the 1H delay circuit 89. Note that blocks enclosed by dotted lines in FIG. 19A are not used in the luminance signal processing.

In FIG. 19B, a digital video signal output from the memory 87 is supplied to the DSP 11 constituting a chrominance separator 98, and a chrominance signal is separated from the video signal. The chrominance signal is supplied to the DSP 12 constituting a chrominance demodulator 99 to be subjected to chrominance demodulation processing. The processed signal is supplied to the DSP 2n constituting a hue adjustment circuit 100 to be subjected to hue adjustment processing. Thereafter, the processed signal is supplied to the memory 88. Note that blocks enclosed by dotted lines in FIG. 19B are not used in the chrominance signal processing.

FIG. 20 shows processing operations of the DSPs 11 to mn constituting the DSP signal processor 40 in the luminance signal processing and the chrominance signal processing in contrast to each other. In FIG. 17, a chrominance signal is compressed, and is processed during a non-video period. Alternatively, a luminance signal may be compressed and processed during a non-video period, as a matter of course.

What is claimed is:

1. An image reproduction apparatus for converting an input video signal into a digital signal and performing a plurality of systems of signal processing operations of the digital video signal, comprising:
   a DSP signal processor constituted by combining a plurality of DSPs each incorporating a program memory which stores a plurality of programs corresponding to the plurality of systems of signal processing operations in independent areas;
   switching means for addressing said areas of said program memory incorporated in each of said plurality of DSPs of said DSP signal processor to time-divisionally switch the programs to be supplied to said plurality of DSPs on the basis of a transmission timing of the video signal, wherein said switching means selects first and second programs corresponding to different systems of signal processing operations during a video period and a blanking period, respectively, of the video signal from said program memory of each of said DSPs, and
   wherein said first and second programs correspond to luminance signal processing and chrominance signal processing, respectively.

2. An image reproduction apparatus for converting an input video signal into a digital signal and performing a plurality of systems of signal processing operations of the digital video signal, comprising:
   a DSP signal processor constituted by combining a plurality of DSPs each incorporating a program memory;
   memories, arranged outside said plurality of DSPs of said DSP signal processor, for storing a plurality of programs corresponding to a plurality of systems of signal processing operations; and
   switching means for time-divisionally switching desired programs from said memories on the basis of a transmission timing of the video signal, and causing said program memory of each of said DSPs to load the switched program, wherein said switching means transfers first and second programs corresponding to different systems of signal processing operations during a video period and a blanking period, respectively, of the video signal to said program memory of each of said DSPs.

3. The apparatus according to claim 2, wherein said first and second programs correspond to video signal processing and ghost cancel processing, respectively.

4. The apparatus according to claim 2, wherein said first and second programs correspond to luminance signal processing and chrominance signal processing, respectively.

* * * * *